US011898373B2

(12) United States Patent
Woodley et al.

(10) Patent No.: US 11,898,373 B2
(45) Date of Patent: Feb. 13, 2024

(54) ASSEMBLY FOR EXIT DEVICE

(71) Applicant: dormakaba USA Inc., Indianapolis, IN (US)

(72) Inventors: Jamison D. Woodley, Indianapolis, IN (US); Jason C. Clifford, Noblesville, IN (US); Xiaohui Yan, Shenzhen (CN); Can Zhang, Xinyi (CN)

(73) Assignee: dormakaba USA Inc., Indianapolis, IN (US)

( * ) Notice: Subject to any disclaimer, the term of this patent is extended or adjusted under 35 U.S.C. 154(b) by 292 days.

(21) Appl. No.: 17/323,934

(22) Filed: May 18, 2021

(65) Prior Publication Data

US 2021/0363785 A1 Nov. 25, 2021

Related U.S. Application Data

(60) Provisional application No. 63/072,146, filed on Aug. 29, 2020, provisional application No. 63/026,775, filed on May 19, 2020.

(51) Int. Cl.

*E05B 47/00* (2006.01)
*E05B 65/10* (2006.01)
*E05B 41/00* (2006.01)

(52) U.S. Cl.

CPC .......... *E05B 47/0012* (2013.01); *E05B 41/00* (2013.01); *E05B 65/1093* (2013.01); *E05B 65/1053* (2013.01); *E05B 2047/0016* (2013.01); *E05B 2047/0023* (2013.01); *E05B 2047/0074* (2013.01)

(58) Field of Classification Search

CPC ..... E05B 2047/0074; E05B 2047/0023; E05B 2047/0016; E05B 65/1053; E05B 65/1093; E05B 41/00; E05B 47/0012

See application file for complete search history.

(56) References Cited

U.S. PATENT DOCUMENTS 3,722,938 A 3/1973 Bauer et al.
5,085,475 A * 2/1992 Austin ................ E05B 65/1093 292/144
6,116,661 A 9/2000 Overbey et al.
6,565,130 B1 * 5/2003 Walsh, III ............. E05B 65/108 292/201
7,484,777 B2 2/2009 Condo et al.
7,779,973 B2 * 8/2010 Ko ......................... A63B 22/02 188/300
7,862,091 B2 * 1/2011 Escobar .............. E05B 65/1053 292/201
7,883,123 B2 2/2011 Condo et al.

(Continued)

FOREIGN PATENT DOCUMENTS

WO 1999035356 7/1999

OTHER PUBLICATIONS

1 Canadian Office Action dated Jul. 29, 2022 in corresponding Canadian Application No. 3,119,092.

*Primary Examiner* — Mark A Williams

(74) *Attorney, Agent, or Firm* — Faegre Drinker Biddle & Reath LLP

(57) ABSTRACT

A motorized latch retraction system for transitioning a latch of an exit device from a latched position to an unlatched position is provided. The motorized latch retraction system includes a lock indicator indicating the latched or unlatched position of the latch and a floating motor.

18 Claims, 23 Drawing Sheets

(56) References Cited

U.S. PATENT DOCUMENTS

| | | | | |
|---|---|---|---|---|
| 8,182,003 | B2 | 5/2012 | Dye et al. | |
| 8,480,136 | B2 | 6/2013 | Dye et al. | |
| 8,495,836 | B2 | 7/2013 | Lowder et al. | |
| 8,851,530 | B2 * | 10/2014 | Geringer ............. | E05B 47/0012 292/201 |
| 8,978,305 | B2 * | 3/2015 | Morstatt ............. | E05B 65/1093 292/201 |
| 9,822,552 | B2 | 11/2017 | Eller et al. | |
| 9,939,054 | B2 * | 4/2018 | Stephenson ......... | E05B 65/1053 |
| 9,945,158 | B2 | 4/2018 | Lehner, Jr. et al. | |
| 10,107,015 | B2 * | 10/2018 | Geringer ............. | E05B 47/0012 |
| 10,174,525 | B2 * | 1/2019 | Arlinghaus ........... | E05B 15/004 |
| 10,236,801 | B2 | 3/2019 | Dye et al. | |
| 10,370,872 | B2 * | 8/2019 | Pfunder ................ | E05B 65/108 |
| 10,745,942 | B2 | 8/2020 | Lehner, Jr. et al. | |
| 11,332,961 | B2 * | 5/2022 | Arlinghaus ......... | E05B 47/0012 |
| 2008/0012350 | A1 * | 1/2008 | Condo ................ | E05B 65/1093 292/92 |
| 2008/0295550 | A1 | 12/2008 | Schmidt | |
| 2011/0047874 | A1 * | 3/2011 | Lowder ............... | E05B 65/1053 49/31 |
| 2015/0115624 | A1 | 4/2015 | Frolov et al. | |
| 2015/0184426 | A1 | 7/2015 | Arlinghaus et al. | |
| 2017/0292294 | A1 | 10/2017 | Brennan et al. | |
| 2020/0190856 | A1 | 6/2020 | Kaverina | |
| 2021/0363785 | A1 | 11/2021 | Woodley et al. | |

* cited by examiner

ASSEMBLY FOR EXIT DEVICE

CROSS REFERENCE TO RELATED APPLICATIONS

This application claims priority to U.S. Provisional Patent Application Ser. No. 63/026,775 filed May 19, 2020 and to U.S. Provisional Patent Application Ser. No. 63/072,146 filed Aug. 29, 2020, the entire disclosures of both of which are hereby incorporated by reference in their entireties.

FIELD

The present disclosure relates to an assembly for motorized latch retraction for exit devices. More specifically, a floating motor assembly and a lock/unlock indicator is provided for a motorized latch retraction assembly.

BACKGROUND

Motorized latch retraction ("MLR") is implemented with exit devices to allow a push bar assembly or latch system to be actuated via a motor in order to retract and release a latch from engagement, for example, with a door frame, mullion, astragal, or otherwise. MLR generally requires a user to set-up the device and perform a calibration of the device once installed to ensure that the device is properly installed and functioning. The calibration of the MLR is crucial as each system on which the MLR is integrated may be slightly different. For example, each system might have different dimensions due to differences in models, tolerances in manufacturing, and differences in installations of doors and exit devices. Common problems with uncalibrated MLR systems include worn motors from stalling the motors and incomplete disengagement of latches. An indication of the locked or unlocked status of an MLR can be beneficial to, e.g., signal that passage through an associated door or other barrier is prohibited.

SUMMARY

The present disclosure provides a motorized latch retraction system for transitioning a latch of an exit device from a latched position to an unlatched position and a lock indicator useable to signal the locked or unlocked state of a lock. Throughout this document, "inside" will be used to reference the side of a door and lock actuator available to occupants of an area secured by the lock, while "outside" will be used to reference the side of a door and lock actuator available to those seeking ingress to the secured area.

In one form of the disclosure, a motorized latch retraction system for transitioning a latch of an exit device from a latched position to an unlatched position is provided. The motorized latch retraction system of this form of the disclosure comprising: a retraction assembly including a retraction arm operably coupled to the latch of the exit device and moveable between a first position corresponding to the latched position of the latch and a second position corresponding to the unlatched position of the latch; a motor assembly including: a motor; an actuator extending from the motor and actuatable by the motor, the actuator operably coupled to the retraction arm to actuate the retraction arm and the latch between the latched position and the unlatched position; and an lock indicator having a visible lock indicator and a visible unlock indicator, the lock indicator operably coupled to the retraction arm such that actuation of the retraction arm actuates the lock indicator, actuation of the retraction arm and the latch to the latched position corresponding to actuation of the lock indicator to a lock indicator position in which the visible lock indicator is viewable and the visible unlock indicator is obscured from view, actuation of the retraction arm and the latch to the unlatched position corresponding to actuation of the lock indicator to an unlock indicator position in which the visible unlock indicator is viewable and the visible lock indicator is obscured from view. In alternative forms, the motorized latch retraction system further comprises a lock indicator actuator, the lock indicator actuator secured for movement in a first direction with the retraction arm, the lock indicator moving along a second direction different from the first direction between the lock indicator position and the unlock indicator position. In further alternative forms, the first direction is orthogonal to the second direction. In further alternative forms, the motorized latch retraction system further comprises a lock indicator guide, the lock indicator guide obstructing movement of the lock indicator along the first direction and guiding movement of the lock indicator along the second direction.

In an exemplary embodiment of the present disclosure, a motorized latch retraction system for transitioning a latch of an exit device from a latched position to an unlatched position is provided, the motorized latch retraction system including a retraction assembly including a retraction arm operably coupled to the latch of the exit device and moveable between a first position corresponding to the latched position of the latch and a second position corresponding to the unlatched position of the latch; and a motor assembly including a floating motor; an actuator extending from the floating motor and actuatable by the floating motor, the actuator operably coupled to the retraction arm to actuate the retraction arm and the latch; a restrictor positioned relative to the retraction assembly, the restrictor defining a floating space, the motor positioned within the floating space, the restrictor limiting movement of the motor in a first predefined dimension; and a restraint operably coupled to the floating motor and operable to selectively restrain the floating motor in a second predefined dimension when the retraction arm is not in the second position and to selectively permit the floating motor to move in the second predefined dimension within the floating space when the retraction arm is in the second position.

In an example thereof, the floating motor is operable to linearly translate within the floating space when the retraction arm of the retraction assembly is in the second position and the floating motor continues to be energized.

In a further example thereof, the restraint is a compression spring positioned between the floating motor and the retraction assembly.

In an example thereof, the actuator includes a safety release section.

In an example thereof, the restrictor is operable to limit rotational movement of the floating motor.

In an example thereof, the retraction assembly further includes a retraction guide, the retraction guide operable to receive the retraction arm and limit movement of the retraction arm to linear movement.

In a further example thereof, the retraction assembly further includes a dogging member for limiting linear movement of the retraction arm when the dogging member is engaging the retraction arm.

In an exemplary embodiment of the present disclosure, an actuator for transitioning a latch of an exit device from a latched position to an unlatched position is provided, the actuator including a motor; a threaded rod operably coupled to the motor; a restrictor having a restrictor body having a first longitudinal end and a second longitudinal end, the motor positioned within the restrictor and longitudinally moveable between the first and second longitudinal ends of the restrictor; a resilient restraint positioned between the first longitudinal end of the restrictor and the motor; and a retraction arm operably coupled to the threaded rod such that when the motor is actuated the retraction arm is translated toward the first longitudinal end of the restrictor, the retraction arm operable to transition from a first position associated with the latched position of the latch to a second position associated with the unlatched position of the latch, wherein, when the retraction arm is in the second position and limited from further movement toward the first longitudinal end of the restrictor, the motor translates toward the first longitudinal end of the restrictor and at least partially compresses the resilient restraint.

In an example thereof, the resilient restraint is a compressible spring.

In an example thereof, the threaded rod includes a safety release section that is at least partially unthreaded such that the retraction arm may translate along the safety release section.

In an example thereof, the restrictor includes guides corresponding to portions of the motor, the guides operable to restrict rotational movement of the motor while permitting linear movement of the motor between the first and second longitudinal ends of the restrictor.

In an example thereof, the motor is a non-contact stepper motor.

In an example thereof, when the retraction arm is in the second position, the retraction arm is positioned abutting the restrictor.

In an example thereof, the actuator further comprises a retraction guide, the retraction guide operable to receive the retraction arm and limit movement of the retraction arm to linear movement.

In a further example thereof, the actuator further comprises a dogging member for limiting linear movement of the retraction arm when the dog is engaging the retraction arm.

In an exemplary embodiment of the present disclosure, a motorized latch retraction system with mechanical dogging for retaining a latch of an exit device in an unlatched position is provided, the motorized latch retraction system including a retraction arm operably coupled to the latch of the exit device and moveable between an extended position and a retracted position; a motor coupled to the retraction are, the motor including an actuation member extending therefrom, the actuation member operably coupled to the retraction arm and operable to transition the retraction arm from the extended position to the retracted position; and a mechanical dogging member moveably coupled to the retraction arm, the dogging member operable to be positioned in an active position and a passive position, the dogging member limiting movement of the retraction arm relative to the retraction guide when in the active position.

In an example thereof, the motor is a floating motor.

In an example thereof, the motorized latch retraction system further comprises a retraction guide, the retraction guide operable to receive the retraction arm and limit movement of the retraction arm to linear movement.

In a further example thereof, the retraction guide further includes a dogging coupling portion, the dogging coupling portion operable to engage the dogging member in a rotatable engagement.

In an example thereof, the retraction arm includes a catch element that is operable to engage with the dogging member.

Any of the exemplifications described above or anywhere herein may also feature an lock indicator having a visible lock indicator and a visible unlock indicator, the lock indicator operably coupled to the retraction arm such that actuation of the retraction arm actuates the lock indicator, actuation of the retraction arm to the first position (or the extended position) corresponding to actuation of the lock indicator to a lock indicator position in which the visible lock indicator is viewable and the visible unlock indicator is obscured from view, actuation of the retraction arm to the second position (or the retracted position) corresponding to actuation of the lock indicator to an unlock indicator position in which the visible unlock indicator is viewable and the visible lock indicator is obscured from view.

In an exemplary embodiment of the present disclosure, a method of transitioning a latch of an exit device from a latched position to an unlatched position is provided, the method including actuating a motor positioned at least partially in a floating space of a restrictor coupled to a retraction guide, the motor including an actuator operably coupled to a retraction arm that is moveable relative to the retraction guide, such that the motor transitions the retraction arm from an extended position to a retracted position; maintaining the position of the motor with respect to the restrictor while the motor transitions the retraction arm from the extended position to the retracted position; and allowing the motor to move relative to the restrictor after the retraction arm is in the retracted position.

In an example thereof, the step of allowing the motor to move includes the motor transitioning from a first position to a second position relative to the restrictor such that a resilient restraint positioned between the motor and the retraction guide is compressed.

In an exemplary embodiment of the present disclosure, a method of operating a motorized latch retraction system with mechanical dogging is provided, the method including actuating a motor coupled to a retraction guide, the motor including an actuation member extending therefrom and operably coupled to a retraction arm that is movable relative to the retraction guide, such that the motor transitions the retraction arm from an extended position to a retracted position; and transitioning a dogging member from a passive position to an active position, the dogging member coupled to the retraction guide and operable to limit movement of the retraction arm relative to the retraction guide when in the active position.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
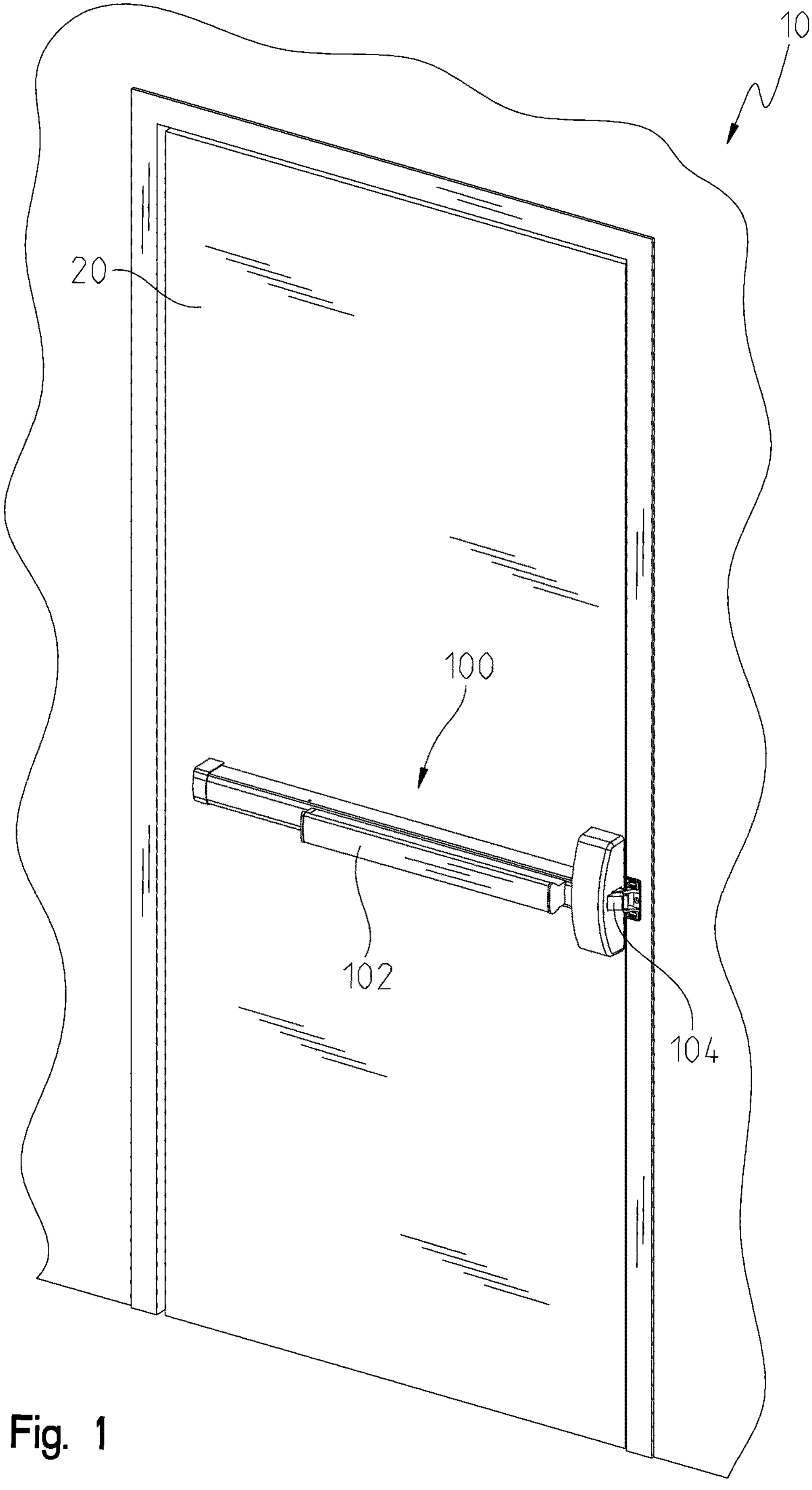
FIG. 1 is a perspective view of a fenestration unit having an exit device, according to an embodiment.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features. The term couple is understood to include either direct or indirect coupling.

Figure 2:
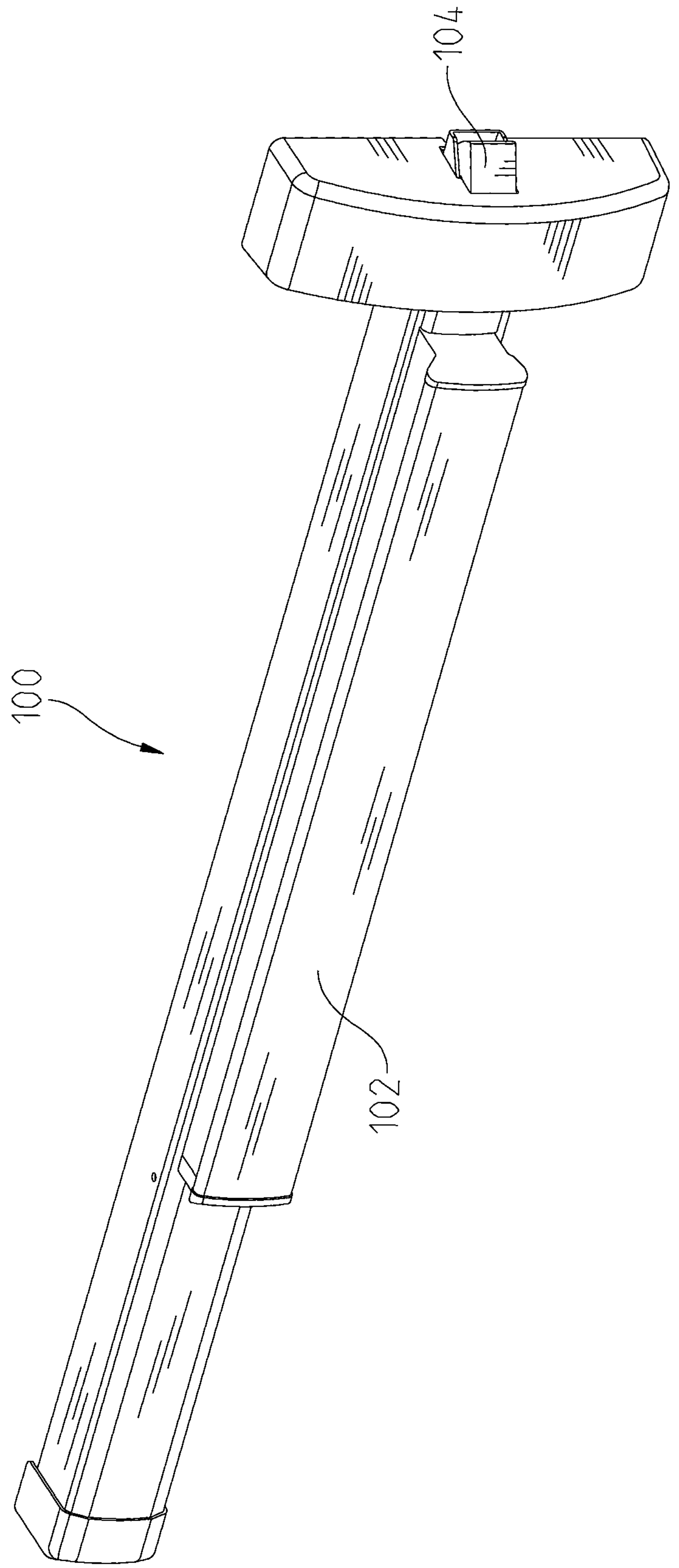
FIG. 2 is a perspective view of an exit device, according to an embodiment.
Figure 3:
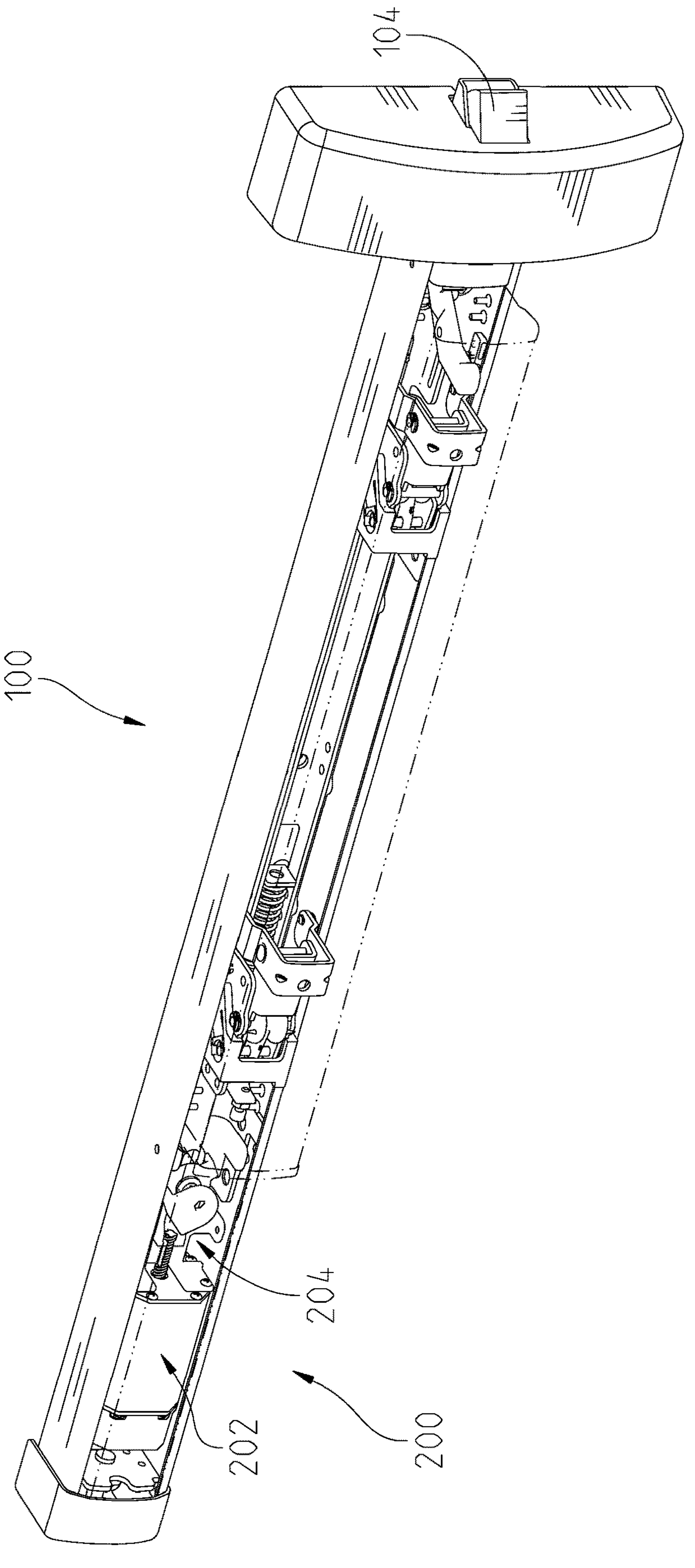
FIG. 3 is perspective view of an exit device including a motorized latch retraction system, according to an embodiment.

Referring to FIGS. 1-3, fenestration unit 10 is shown with exit device 100 in accordance with an aspect of the present disclosure. Exit device 100 may be manually actuated via touch bar 102 to release latch 104 which allows door 20 of fenestration unit 10 to be opened. Exit device 100 incorporates motorized latch retraction ("MLR") system 200 (not seen in FIG. 1 or 2) that allows for latch 104 to be released. MLR system 200 is operably coupled to latch 104 such that when MLR system 200 is activated, latch 104 is transitioned from the latched position (shown in FIGS. 1-3) to an unlatched position (not shown) and is released from the frame such that door 20 may be opened.

With specific reference to FIG. 3, MLR system 200 includes motor assembly 202 and retraction assembly 204. Motor assembly 202 provides the force required for releasing latch 104 and retraction assembly 204 transmits that force to latch 104, either directly or indirectly. Retraction assembly 204 is operable to be actuated between a latched position and an unlatched position. In some embodiments, components of retraction assembly 204 are operable to linearly translate. Retraction assembly 204 includes hard stops at which the components of retraction assembly 204 have been fully actuated. Motor assembly 202 is a floating motor assembly. For example, the floating motor assembly includes components that are operable to positionally move after retraction assembly 204 has been fully actuated and motor assembly 202 continues to be actuated.

Figure 4:
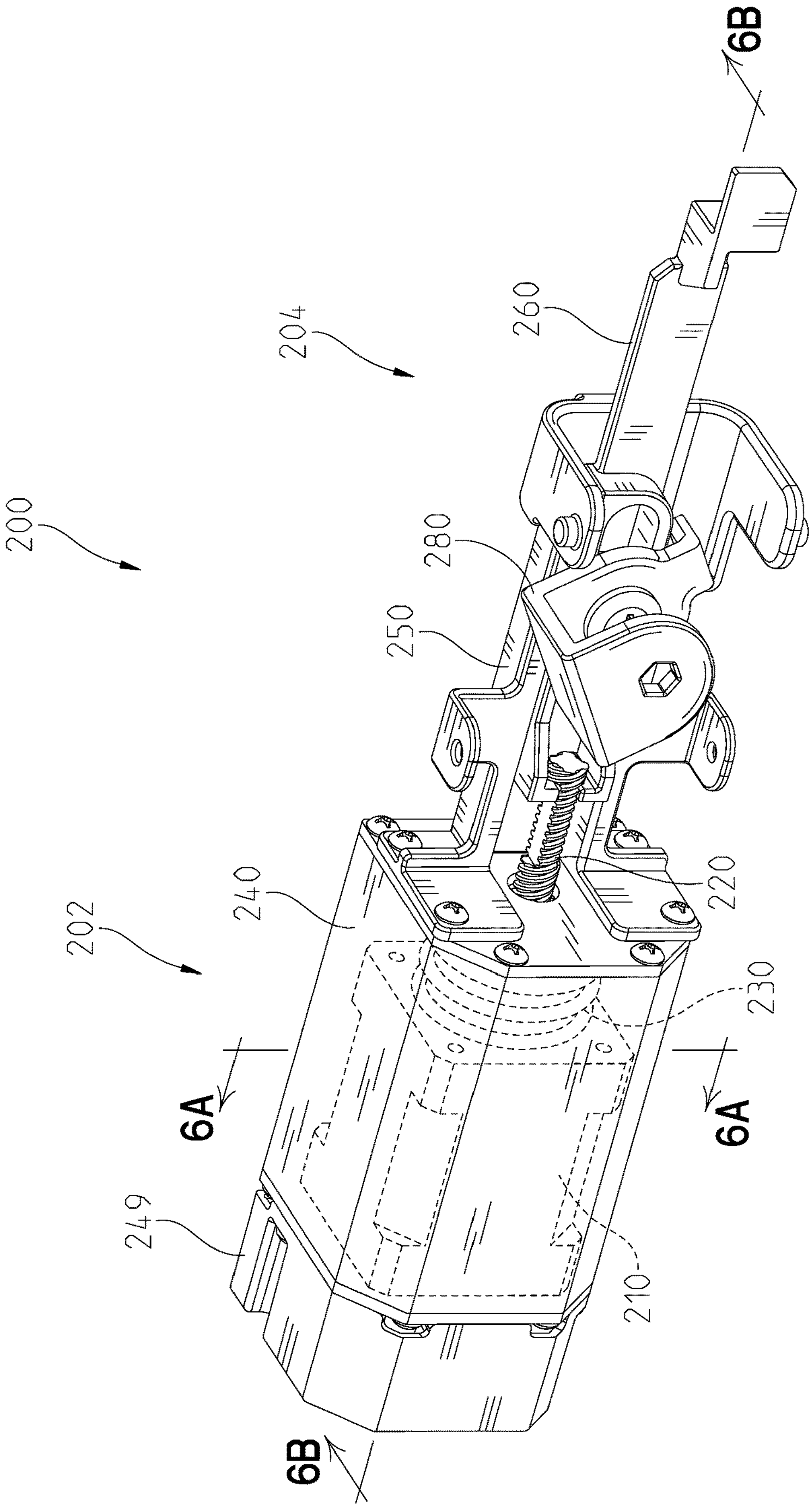
FIG. 4 is a perspective view of a motorized latch retraction system, according to an embodiment.
Figure 5:
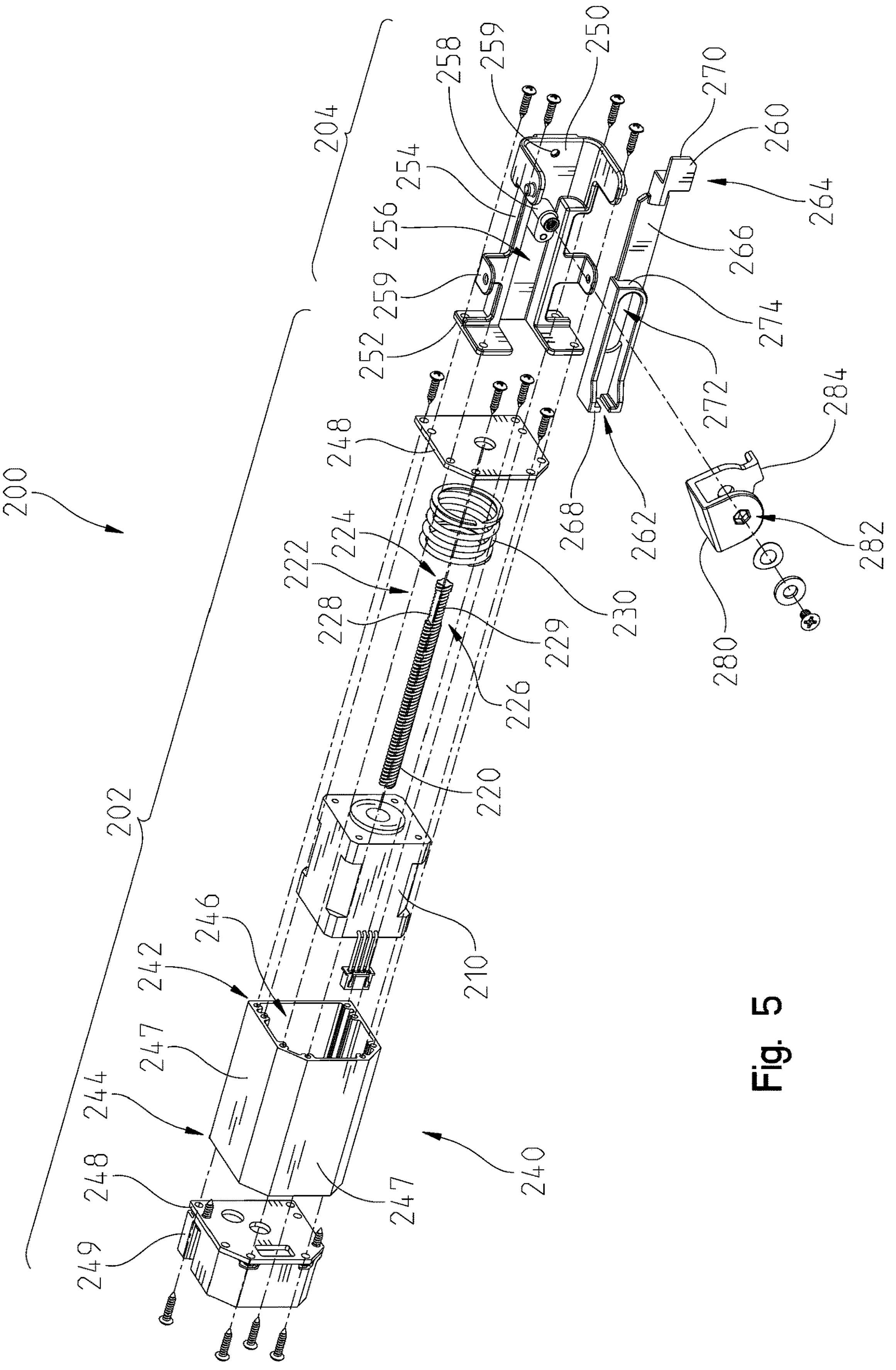
FIG. 5 is an exploded view of a motorized latch retraction system, according to an embodiment.
Figure 6A:
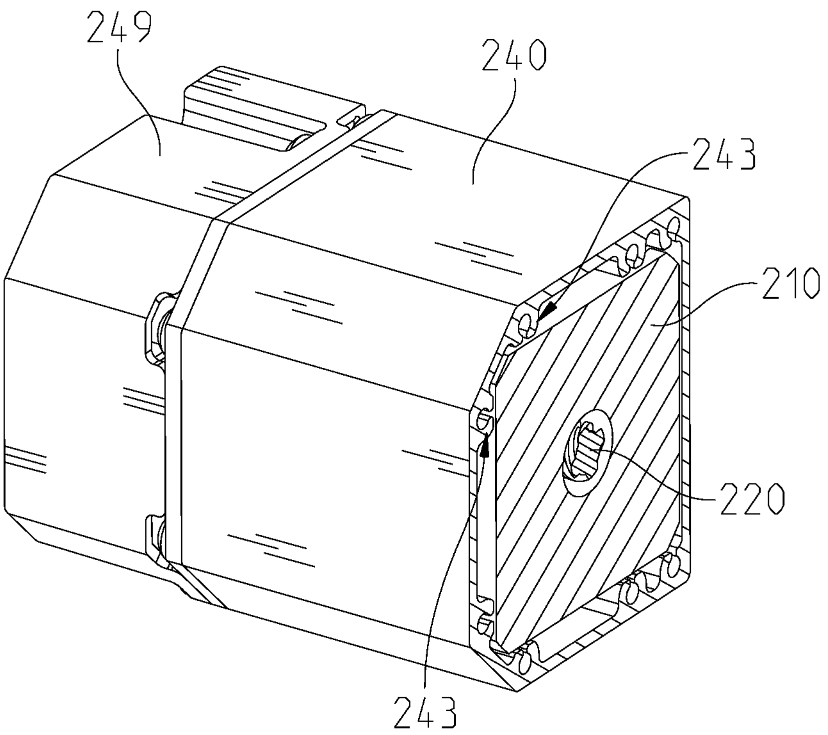
FIG. 6A is a section view of a motor of a motorized latch retraction system, according to an embodiment.
Figure 6B:
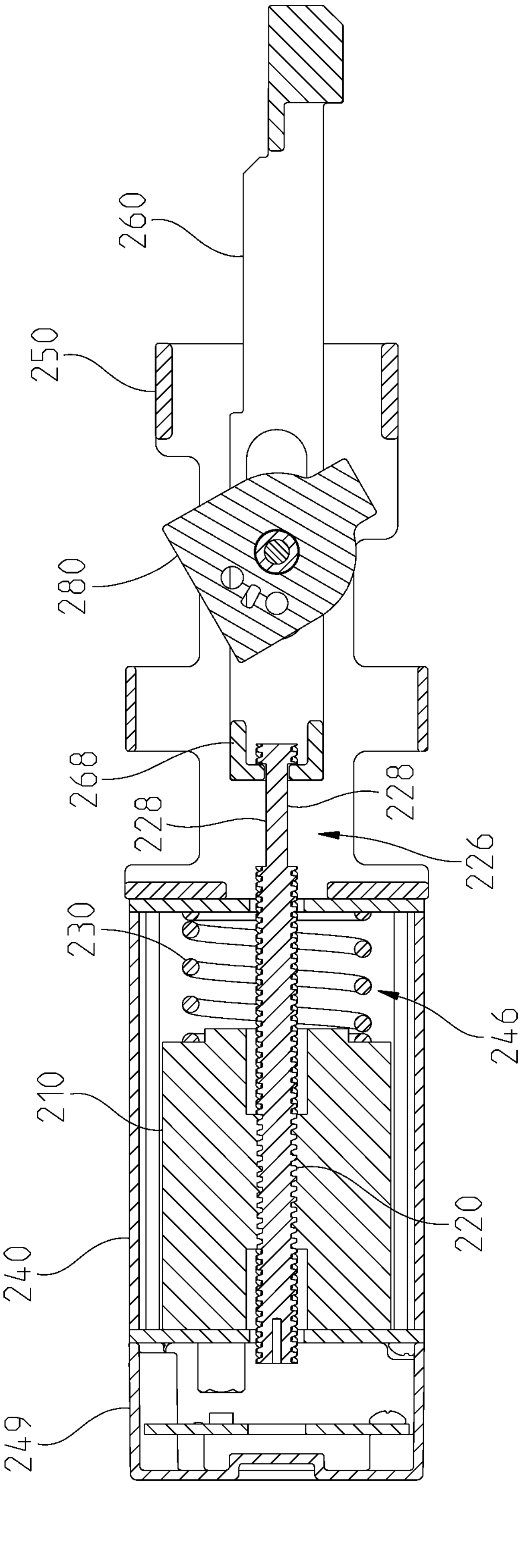
FIG. 6B is a section view of a motorized latch retraction system, according to an embodiment.

Referring to FIGS. 4-6, motor assembly 202 includes motor 210, actuator 220, resilient restraint 230, restrictor 240, and electronics compartment 249. Motor 210 is operable to be energized or actuated, which results in the actuation of MLR system 200. Motor 210 is operable to actuate latch 104 via actuator 220 (e.g., shaft or a threaded rod) and retraction assembly 204. Motor 210 of motor assembly 202 is a floating motor. Motor 210 is limited to specific movements by restrictor 240 that is operably coupled to the motor 210 (e.g., restrictor 240 limits rotational or linear movement of motor 210). Resilient restraint 230 is also operably coupled to motor 210 to limit movement of motor 210 until predetermined conditions are met within MLR system 200 (e.g., retraction assembly 204 is fully retracted and MLR system 200 continues to be energized). Once the predetermined conditions have been met, resilient restraint 230 is operable to allow motor 210 to move (e.g., linear or rotational movement).

In some embodiments, restrictor 240 defines a floating space 246 (FIG. 5). Floating space 246 is operable to allow motor 210 to move in a predetermined manner (e.g., when restrictor 240 limits rotational movement, floating space 246 allows motor 210 to move linearly—in alternative embodiments, a restrictor may selectively allow rotation in the floating space). In some embodiments, restrictor 240 includes first longitudinal end 242 and second longitudinal end 244 with floating space 246 defined therebetween (e.g., the restrictor comprises a bracket or a sleeve). Floating space 246 has a longitudinal length that is longer than a longitudinal length of motor 210. Floating space 246 is defined by restrictor 240 and dimensioned such that motor 210 is restrained from rotation about the longitudinal axis of motor 210 (coinciding with the longitudinal axis of motor shaft, i.e., actuator 220) and lateral movement relative to restrictor 240. Restrictor 240 allows longitudinal movement of motor 210 relative to restrictor 240. For example, when restrictor 240 includes four side walls 247 and two end walls 248, side walls 247 are positioned or formed to have portions that are positioned near or contacting, with tolerances, the lateral walls of motor 210 (e.g., a motor housing). End walls 248 are positioned from each other at a distance greater than the longitudinal length of motor 210 and define first and second longitudinal ends 242, 244 of restrictor 240. End walls 248 may either be formed integrally with restrictor 240 or may be fastened to side walls 247. Motor 210 is then able to slide or transition to various positions along the longitudinal length of restrictor 240. The interior space in which motor 210 can move is referred to as the "floating space," exemplified as floating space 246. Alternative "floating spaces" include, e.g., rotational positions selectively occupied by motor 210. Alternative restrictors may include features for restricting lateral and rotational movement of motor 210 while permitting controlled movement, such as longitudinal translation of motor 210 along at least a portion of the longitudinal length of restrictor 240. It is understood that restrictor 240 may be provided in various embodiments, for example having side walls as discussed above, having guide rails, having slots and guides to which motor 210 may couple and along which the motor may longitudinally translate, for example. In another embodiments, restrictor 240 may limit the linear motion of motor 210 while selectively allowing motor 210 to rotate relative to restrictor 240.

As seen in FIG. 6A, the restrictor includes guides 243 (only two of which are numbered in FIG. 6A) that engage with motor 210. Guides 243 are formed to limit specific movements of motor 210 while allowing other types of movement. For example, guides 243 limits the rotational movement of motor 210 (excluding portions of motor 210 such as actuator 220 and components for causing the movement of actuator 220). In other embodiments, guides 243 limit longitudinal movement of motor 210.

Referring, e.g., to FIG. 5, motor assembly 202 further includes actuator 220 extending from motor 210. Actuator 220 is operably coupled to a portion of retraction assembly 204, and thus indirectly to latch 104. Actuator 220, in some embodiments, includes a threaded rod. When motor 210 is, for example, a non-contact stepper motor, the threaded rod is longitudinally movable relative to motor 210. Motor 210 can include apertures at each longitudinal end that allows the threaded rod to extend through the motor 210 as the motor is actuated and acts on the threaded rod. The threaded rod is thus pulled through motor 210. When actuator 220 is a threaded rod, the threaded rod may include safety release section 222 where the threads only extend about a portion of the threaded rod. For example, at safety release section 222, the threads extend around a first section 224 and a second section 226, but the threaded rod is smooth at the lateral sides of safety release section 222 such that the threads do not extend about the lateral sides at safety release section 222, thus defining smooth portions 228 and threaded portions 229. It is understood that smooth portions 228 include planar surfaces, which extend into the root of the threaded rod. For example, safety release section 222 is formed by taking a threaded rod and cutting out sections of the threading and a small portion of the rod itself in a transverse cut. As shown in FIG. 5, safety release section 222 is positioned longitudinally between fully threaded sections of actuator 220. These features will be discussed in greater detail in relation to retraction assembly 204. In another embodiment, motor 210 is a traditional motor which spins actuator 220.

Motor assembly 202 includes resilient restraint 230. Resilient restraint 230 selectively maintains motor 210 in a predetermined position while latch 104 of exit device 100 is being actuated such that motor 210 is maintained in substantially the same position. Once latch 104 has been fully actuated such that retraction arm 260 is limited from further movement, resilient restraint 230 allows motor 210 to move within floating space 246 (e.g., linearly translate or rotate). Because motor 210 is able to continue to operate after latch 104 has been fully actuated, motor 210 does not stall and accordingly reduces wear on motor 210. In one embodiment, resilient restraint 230 includes, for example, a spring positioned between motor 210 and first longitudinal end 242 of restrictor 240. As motor 210 continues to operate after full actuation of latch 104, actuator 220 continues to be pulled through motor 210. Because actuator 220 is coupled to retraction assembly 204 and retraction assembly 204 is fully actuated or retracted, meaning retraction assembly 204 and consequently actuator 220 are impeded from continued travel, motor 210 translates in a longitudinal direction. Motor 210 is operable to translate in the longitudinal direction as the compressible member (e.g., the spring) is compressed between motor 210 and end wall 248 of restrictor 240. It is understood that various embodiments and placements of resilient restraint 230 within motor assembly 202 may be implemented. For example, resilient restraint 230 may include a hydraulic shock. Motor assembly 202 may include a plurality of resilient restraints 230. In other embodiments, resilient restraint 230 may include a tension spring that is positioned between end wall 248 of restrictor 240 at second longitudinal end 244 and the motor 210 is coupled to the tension spring such that when retraction assembly 204 is fully actuated, motor 210 translates toward retraction assembly 204 and thereby elongates resilient restraint 230. In another embodiment, resilient restraint 230 limits rotational movement of motor 210 until predetermined conditions are met, upon which the motor is operable to rotate. Resilient restraint 230 is operable to allow motor 210 to float within motor assembly 202. Motor 210 of MLR system 200 is operable to increase longevity of motor 210 without having to perform onsite, installation-specific calibration of motor 210 to prevent stalling of motor 210 when retraction assembly 204 is bottomed out and latch 104 is fully actuated.

With reference to FIGS. 4-6, MLR system 200 further includes retraction assembly 204. In one embodiment, retraction assembly 204 includes retraction guide 250, retraction arm 260, and a dog or dogging member 280. Retraction guide 250 provides a structure relative to which retraction arm 260 translates. Retraction guide 250 is coupled to restrictor 240 of motor assembly 202. Retraction arm 260 is operably coupled to actuator 220 of motor assembly 202. Retraction arm 260 is also operably coupled, either directly or indirectly, to the latch 104.

Referring to FIG. 5, retraction guide 250 includes end plate 252 from which body 254 extends. End plate 252 is coupled to restrictor 240, for example at end wall 248 of restrictor 240. In some embodiments, end plate 252 of retraction guide 250 and end wall 248 of restrictor 240 are an integral unit. Body 254 includes receiver 256 which receives at least a portion of retraction arm 260. Receiver 256 is to allow retraction arm 260 to translate in a longitudinal direction and to restrain retraction arm 260 in lateral directions. Body 254 may also include a dogging coupling portion 258 to which the dogging member 280 is coupled. In some embodiments, dogging coupling portion 258 is positioned in receiver 256. Retraction guide 250 may include various other coupling portions 258 which allow retraction guide 250 to be coupled to various structures in exit device 100. In some embodiments, retraction guide 250 is integral with portions of exit device 100, for example a base plate. In some embodiments, retraction guide 250 includes various coupling elements 259 (i.e., bolt hole) to which various portions of exit device 100 are coupled. For example, coupling element 259 is used to couple retraction guide 250 to exit device 100 or door 20.

As previously discussed, retraction assembly 204 includes retraction arm 260. Retraction arm 260 includes first longitudinal end 262, second longitudinal end 264, and retraction arm body 266. Retraction arm body 266 is formed such that retraction arm 260 is received in receiver 256 of retraction guide 250. First longitudinal end 262 of retraction arm 260 is operably coupled with actuator 220. Second longitudinal end 264 is operably coupled with latch 104. Retraction arm 260 is operable to transmit the force imparted by motor 210 via actuator 220, to latch 104. In the simplest configurations, retraction arm 260 may simply pull latch 104 to a withdrawn or unlatched position freely permitting opening and closing of the door to which exit device 100 is operably secured when retraction arm 260 is pulled toward motor 210. In these simplest configurations, motor actuation of retraction arm 260 to move retraction arm 260 away from motor 210 can push latch 104 to an extended or latched position. Intervening elements may be positioned between motor 210 and retraction arm 260.

First longitudinal end 262 of retraction arm 260 includes actuator receiver 268 for engaging with actuator 220. In some embodiments, actuator receiver 268 includes slot 269 which allows actuator receiver 268 to be positioned around the outside diameter of actuator 220. For example, actuator receiver 268 is positioned about actuator 220 at safety release section 222 when actuator 220 is a threaded rod. Actuator receiver 268 is appropriately dimensioned to receive smooth portions 228 of safety release section 222. Actuator receiver 268 is dimensioned such that actuator receiver 268 resists rotation of actuator 220 about a longitudinal axis thereof. When actuator 220 is translated in a longitudinal direction away from retraction assembly 204, actuator receiver 268 contacts the threaded section at the distal tip of actuator 220 and retraction arm 260 is pulled back with actuator 220. The threaded section at the distal tip of actuator 220 does not have to be threaded, but would include a structure against which actuator receiver 268 abuts actuator 220. Safety release section 222 also provides the operability for latch 104 to be released even when actuator 220 is in an extended or non-retracted position. For example, actuator receiver 268 of retraction arm 260 translates toward motor assembly 202 while engaged with actuator 220. Actuator receiver 268 is operable to translate along the length of safety release section 222 without causing movement of actuator 220. This allows latch 104 to be opened manually (e.g., via the touch bar 102) without being locked in place by MLR system 200 or require sufficient force to be applied to actuator 220 to back drive motor 210. However, some embodiments may implement a back-drivable motor or a motor that otherwise incorporates a safe torque off feature. Second longitudinal end 264 of retraction arm 260 includes latch coupling portion 270 operably coupled to latch 104 for retracting latch 104.

Retraction arm 260 may further include aperture 272 through retraction arm body 266. Aperture 272 is dimensioned to permit dogging coupling portion 258 of retraction guide 250 or other structures to extend through retraction arm body 266. Aperture 272 is dimensioned such that retraction arm 260 may longitudinally translate relative to retraction guide 250. Furthermore, aperture 272 is dimensioned to provide longitudinal stops to the translation of retraction arm 260 with respect to retraction guide 250.

In some embodiments, retraction arm 260 includes catch element 274 that allows retraction arm 260 to be maintained at a predetermined longitudinal position. For example, catch element 274 is used in connection with dogging member 280 that will be discussed hereafter. It will be noted that catch element 274 may be positioned such that retraction arm 260 may only be reduced to a longitudinally retracted position (e.g., the latch is unlocked) and not the longitudinally extended position (e.g., the latch is locked or engaged). This prevents the accidental locking of fenestration unit 10, which would be dangerous in an emergency situation.

In some embodiments, dogging member 280 is provided in MLR system 200. Dogging member 280 is operable to block retraction arm 260 from returning to an extended position, thus maintaining exit device 100 in an open state (e.g., latch 104 is not engaged to limit passage through door 20). Dogging member 280 may be included in MLR system 200 as described above, for example by coupling dogging member 280 to dogging coupling portion 258 of retraction guide 250. Dogging member 280 may also be coupled to exit device 100 at other locations. In one embodiment, when dogging member 280 is coupled to dogging coupling portion 258 of retraction guide 250, dogging member includes key portion 282 and obstructing portion 284. Key portion 282 provides the ability to transition dogging member 280 from an engaged state or position to a disengaged state or position. For example, when dogging member 280 is coupled to dogging coupling portion 258 in a rotating engagement such that dogging member 280 rotates into an engaged position and a disengaged position, key portion 282 allows the user to transition dogging member 280 to the various positions. In some embodiments, key portion 282 includes a hex receiver. However, any type of key is contemplated. Obstructing portion 284 of dogging member 280 selectively engages with retraction guide 250 and/or retraction arm 260. For example, obstructing portion 284 is engages with catch element 274 of retraction arm 260 when the retraction arm 260 is in a retracted position.

FIGS. 15-22 illustrate an alternative embodiment exit device 1100. In the embodiment of FIGS. 15-22, dogging member 280 is absent and MLR system 1200 is selectively "electronically dogged," i.e., motor 1210 is utilized to hold exit device 1100 in the unlatched state. Unless described otherwise, the components of the embodiment of FIGS. 15-22 carrying a similar reference numeral, but with 1000 added thereto, are structured and arranged as described in the embodiment of FIGS. 1-8. For the sake of brevity, a description of these shared components is not repeated with respect to the embodiment of FIGS. 15-22. To avoid unnecessary redundancy in the illustrations, not all components of FIGS. 1-8 are illustrated with respect to the embodiments of FIGS. 15-22. Nevertheless, the embodiment of FIGS. 15-22 is identical to the embodiment of FIGS. 1-8 unless otherwise detailed herein.

Figure 7A:
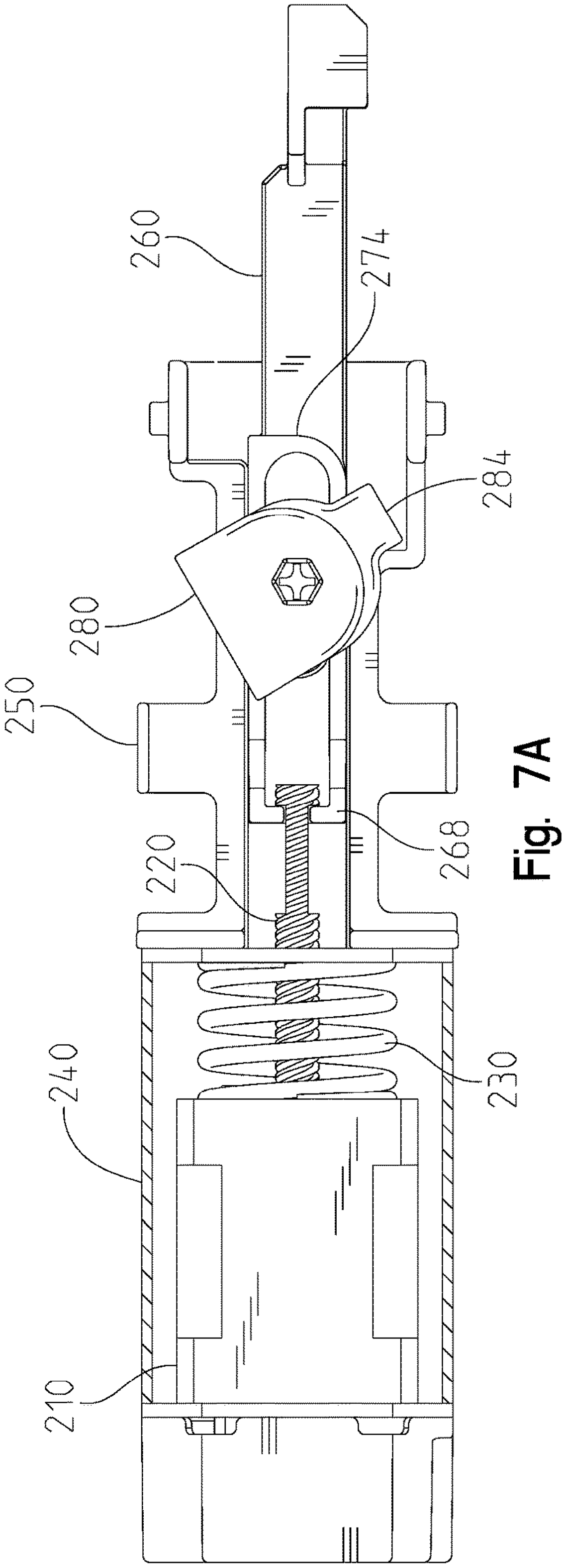
FIG. 7A is a top view of a motorized latch retraction system having a motor assembly coupled to a retraction assembly, where the retraction assembly is in an extended position, according to one embodiment.
Figure 7B:
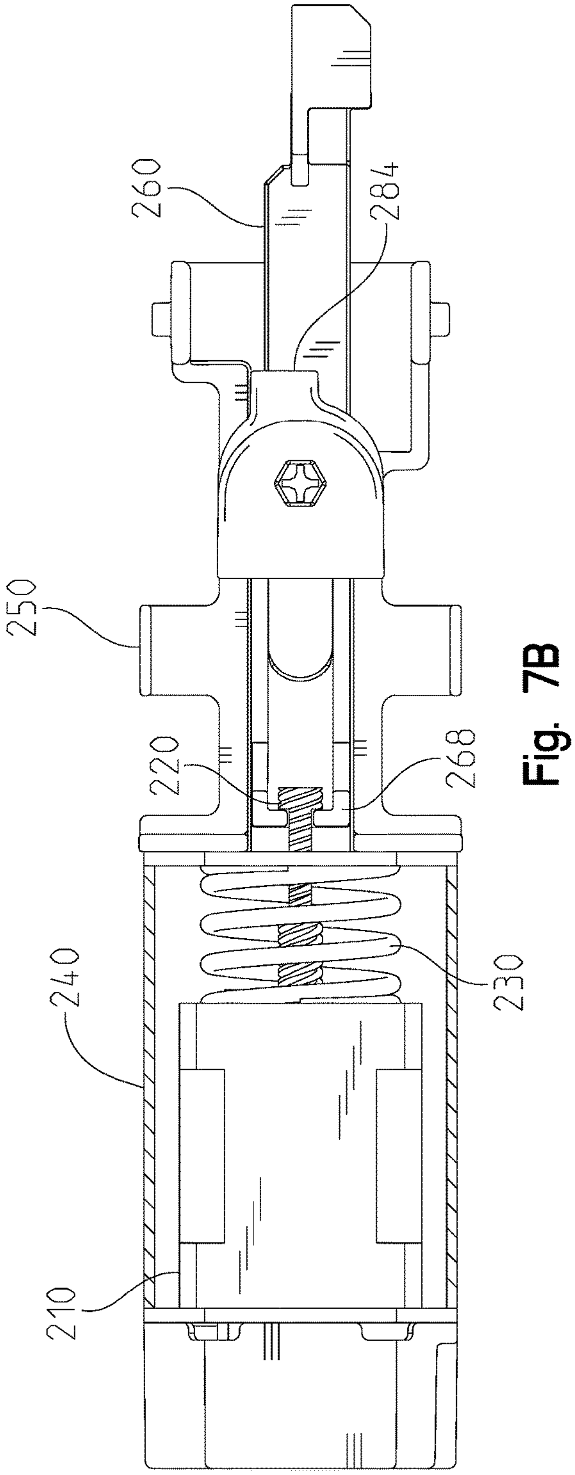
FIG. 7B is a top view of the embodiment shown in FIG. 7A, where the retraction assembly is in a retracted position and the resilient restraint is selectively restraining the motor.
Figure 7C:
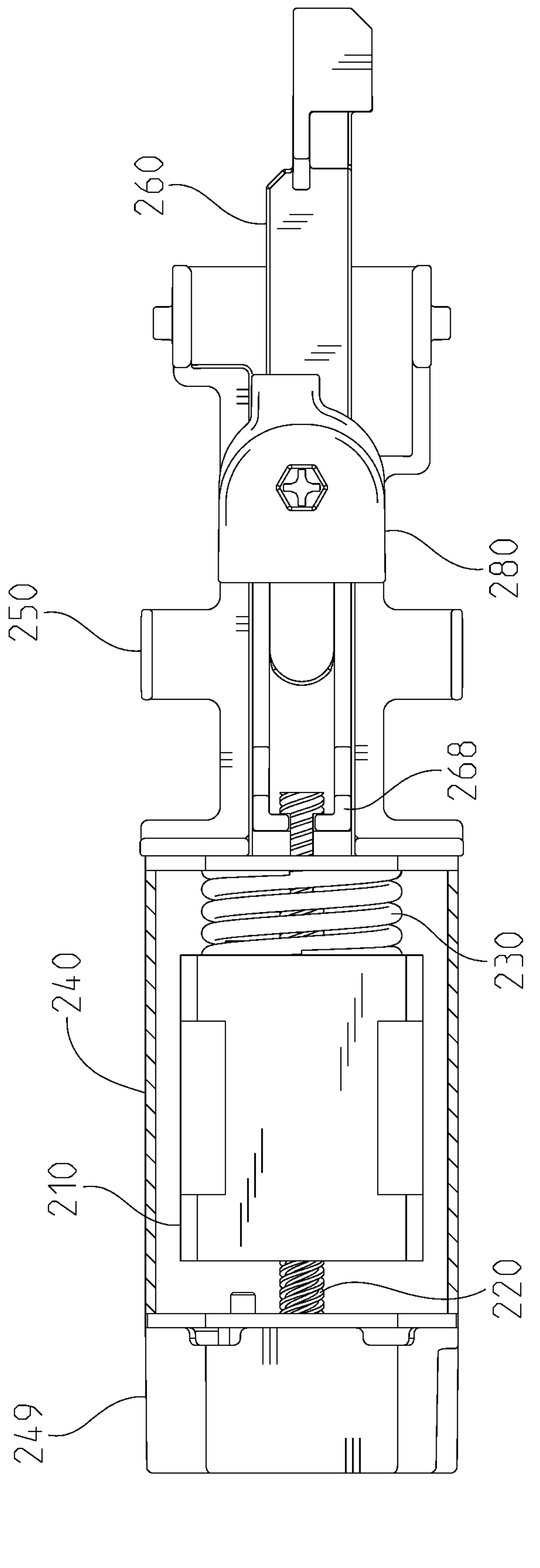
FIG. 7C is a top view of the embodiment shown in FIG. 7A, where the retraction assembly is in a retracted position and the resilient restraint is permitting the motor to move or float.

Turning now to a discussion of FIGS. 7A-7C, MLR system 200 is shown in operation. FIG. 7A provides an exemplary embodiment of MLR system 200 having motor assembly 202 and retraction assembly 204 as discussed above. Motor assembly 202 includes motor 210, actuator 220, resilient restraint 230, and restrictor 240. Retraction assembly 204 includes retraction guide 250, retraction arm 260, and dogging member 280. Motor assembly 202 and retraction assembly 204 are coupled together at longitudinal ends. More specifically, restrictor 240 and retraction guide 250 are coupled together. Furthermore actuator 220 and retraction arm 260 are engaged together. Motor 210 is positioned in restrictor 240 with resilient restraint 230, where the compressible member is in a non-compressed or slightly-compressed state. Actuator 220 and retraction arm 260 are shown in an extended position representing a position in which latch 104 is operable to limit movement of door 20 relative to its door frame. As motor 210 is actuated, actuator 220 and retraction arm 260 begin to longitudinally translate towards motor 210.

FIG. 7B shows MLR system 200 when retraction arm 260 has been retracted to a retracted position. Retraction arm 260 includes a hard stop against either retraction guide 250 at the longitudinal end, restrictor 240 of motor assembly 202, or dogging coupling portion 258 of retraction guide 250. Because each latch system may have different tolerances due to manufacturing or design, and various accessories added that may increase or decrease resistance, a motor will typically require calibration to prevent the motor from stalling once retraction arm 260 has been translated to the retracted position. However, as is described herein, the floating motor feature of the disclosure allows the MLR system to be pre-calibrated to prevent stalling of motor 210. Thus, as seen in FIG. 7B, motor 210 may continue to be actuated even when retraction arm 260 has bottomed out against the hard stop.

As seen in FIG. 7C, motor assembly 202 allows motor 210 to translate longitudinally and to compress, at least partially, resilient restraint 230. Motor 210 is pre-calibrated to cease actuation either at a predetermined position (e.g., relative to the actuator 220) or at a predetermined resistance to actuation. For example, when actuator 220 is coupled to retraction arm 260, motor 210 is actuated to complete 10-15 internal revolutions prior to retraction arm 260 bottoming out against retraction guide 250. As motor 210 continues to be actuated, resilient restraint 230 (i.e., a compression spring) begins to compress, wherein motor 210 can complete another 20-30 internal revolutions before resilient restraint 230 is fully compressed or internal resistance of resilient restraint 230 becomes greater than capacity of motor 210. Motor 210 is pre-calibrated to complete 25 total internal revolutions before motor 210 ceases to be actuated. This allows for retraction arm 260 to be fully retracted while also preventing motor 210 from stalling due to resistance from resilient restraint 230. This allows pre-calibration of motor 210 to accommodate differences between systems due to manufacturing tolerances, installations, and so forth. In another non-limiting example, an exit device 100 may require about 3 lbs. of force to actuate and release latch 104 due to internal resistance. It will be noted that this required force may change over time due to wear, lubrication, added accessories such as vertical bars, and so forth, which might put the force required to actuate and release the latch between 2-6 lbs. In some embodiments, resilient restraint 230 has internal resistance of about 19 lbs. (85 N) initially and about 28 lbs. finally (125 N). The motor 210 in turn is capable of providing about 30 lbs. (133 N) to about 40 lbs. (178 N) at peak. Because of the ratio of the internal forces of exit device 100 and resilient restraint 230, motor 210 is operable to begin compression of resilient restraint 230 until a predetermined position or load, at which point, motor 210 ceases actuation. Motor assembly 202 allows MLR system 200 to be installed pre-calibrated to cease actuation prior to the motor stalling out when the internal forces of exit device 100 are within a predefined range based on the specifications of motor 210 and resilient restraint 230.

In systems with fixed motors and hard stops for retraction arms, the fixed motors must be precisely calibrated after installation to stop actuation. Slight differences such as changes in thicknesses of parts (e.g., replacement parts), settling of components after installation, and so forth, may also require regular maintenance to prevent stalling of the fixed motor or insufficient actuation to unlatch the door latch. However, MLR system 200 is pre-calibrated and is able to accommodate variances in tolerance, installations, and settling of exit devices.

Figure 8A:
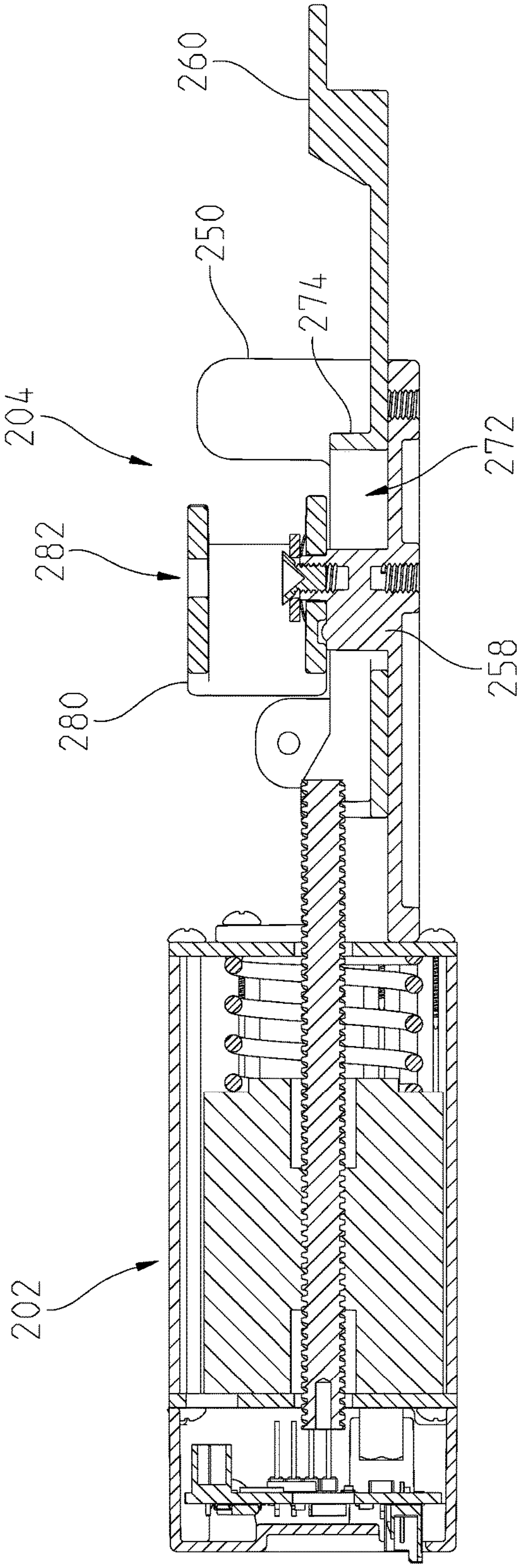
FIG. 8A is a sectional side view of a motorized latch retraction system implementing a mechanical dogging system where the mechanical dog is not engaged with the retraction arm of one embodiment, according to an embodiment.
Figure 8B:
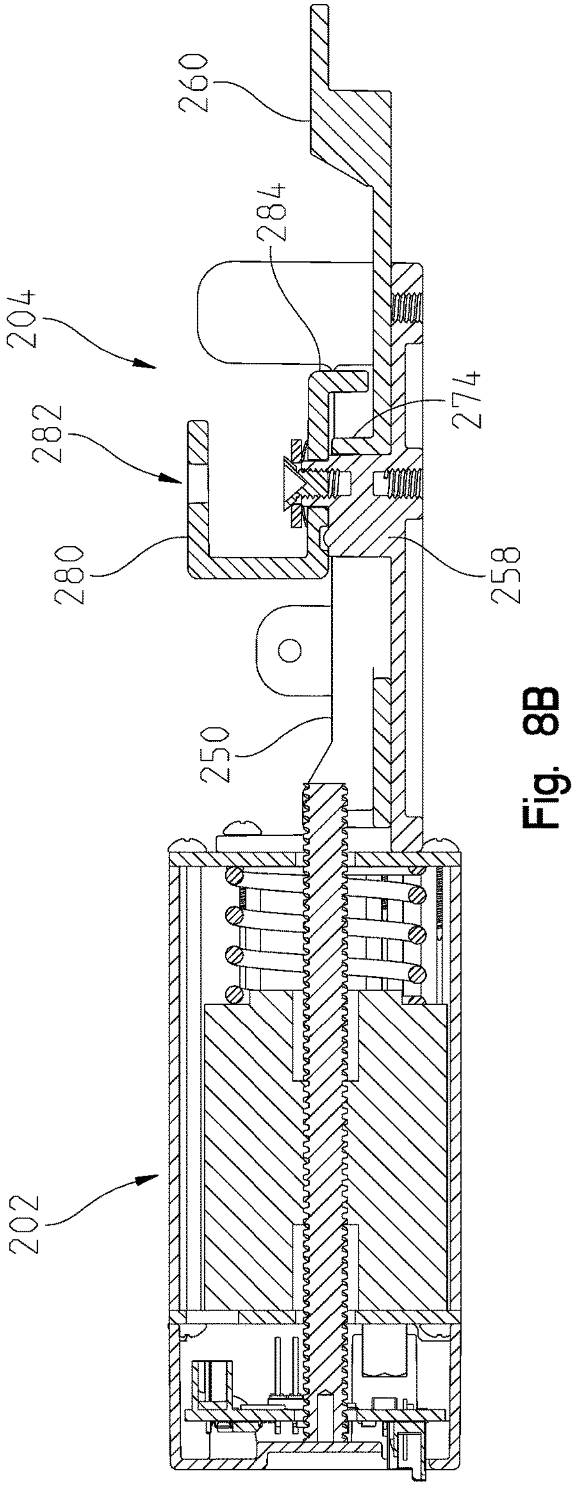
FIG. 8B is sectional side view of the motorized latch retraction system of FIG. 8A where the mechanical dog is engaged with the retraction arm.
Figure 8C:
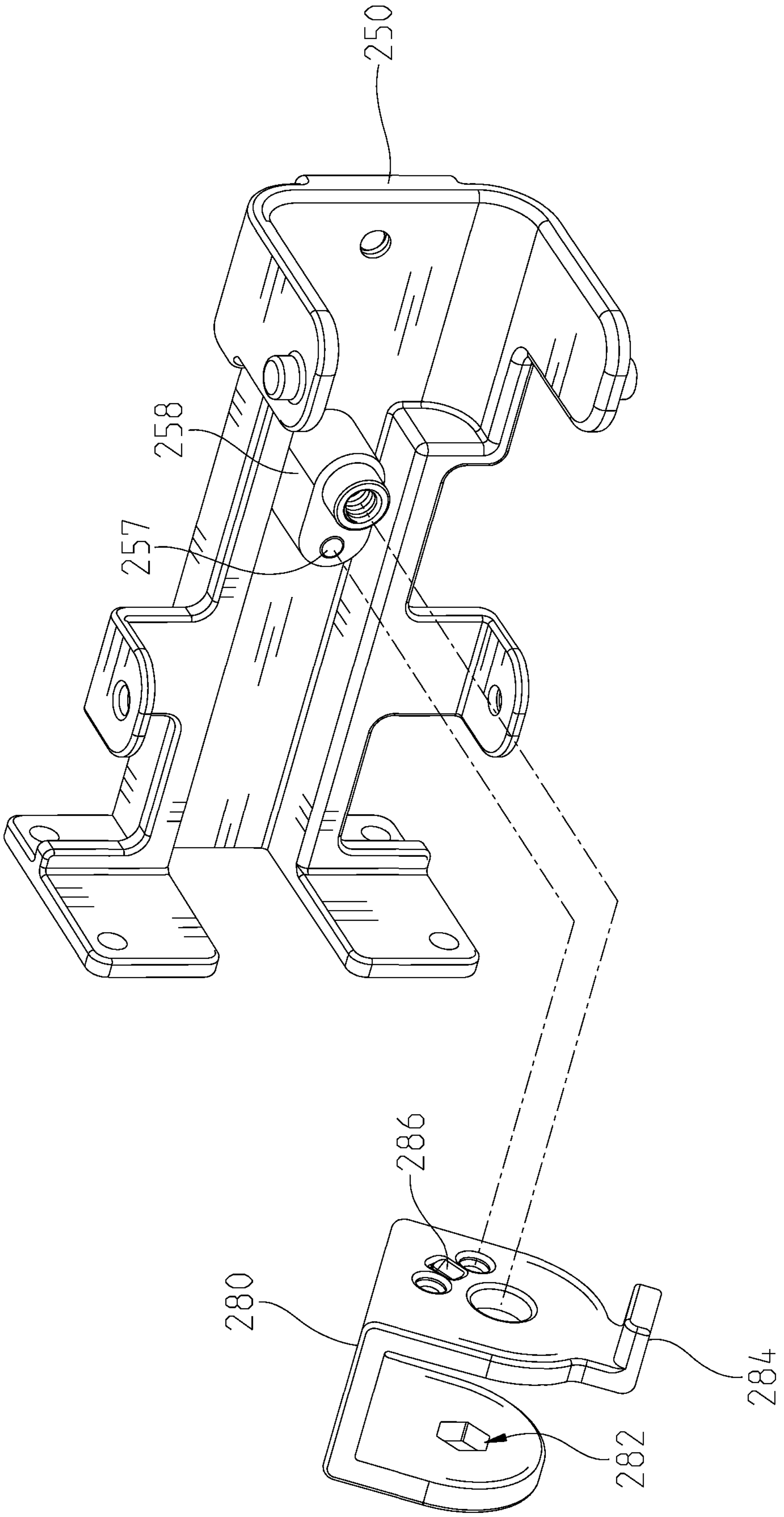
FIG. 8C is an exploded view of components of a mechanical dogging system, according to an embodiment.

MLR system 200 may also include dogging member 280 which can be actuated as discussed above and as seen in FIGS. 8A and 8B. Dogging member 280 allows for latch 104 of exit device 100 to be mechanically dogged in an open position via MLR system 200 without a requirement to run continuous power to motor 210, thus reducing the power required by MLR system 200. As shown in FIG. 8C, dogging member 280 includes catch element 286 that interfaces with corresponding catch element 257 of dogging coupling portion 258, which provides tactile feedback to the user when dogging member 280 is in predefined positions or configurations. Catch elements 257, 286 may also provide resistance to unintentional or migratory movement of dogging member 280.

FIGS. 15-22 illustrate a lock/unlock indicator in accordance with an embodiment of the present disclosure. MLR systems can be utilized with touch bar 102 (illustrated in FIG. 1 and similarly implemented with the embodiment of FIGS. 15-22) accessible to allow egress and a credential reader accessible to read a credential and actuate motor 210/1210 to allow ingress. In this circumstance, it is useful for the occupants of the area protected by the door to which exit device 100/1100 is operably connected to know if the exit device 100/1100 is dogged such that ingress is not restricted. As described herein, dogging member 280 can be utilized to maintain latch 104 in an open position. Alternatively, exit device 1100 may be electronically dogged, as in the embodiment shown in FIGS. 15-22, with motor 1210 maintaining latch 104 (illustrated in FIG. 1 and similarly implemented with the embodiment of FIGS. 15-22) in the open position.

Referring to FIGS. 15-22, exit device 1100 includes housing 400, from which touch bar 102 (illustrated in FIG. 1 and similarly implemented with the embodiment of FIGS. 15-22) extends. Housing 400 features window 410 through which lock indicator 420 is viewable. Window 410 is transparent and is secured to housing 400. Particularly, an aperture through housing 400 is covered by window 410 so that visual access to lock indicator 420 positioned within housing 400 and under window 410 is provided without allowing access to the contents of housing 400. Lock indicator 420 moves with MLR system 200 and provides an indication of whether latch 104 is in the latched or unlatched position.

Figure 17:
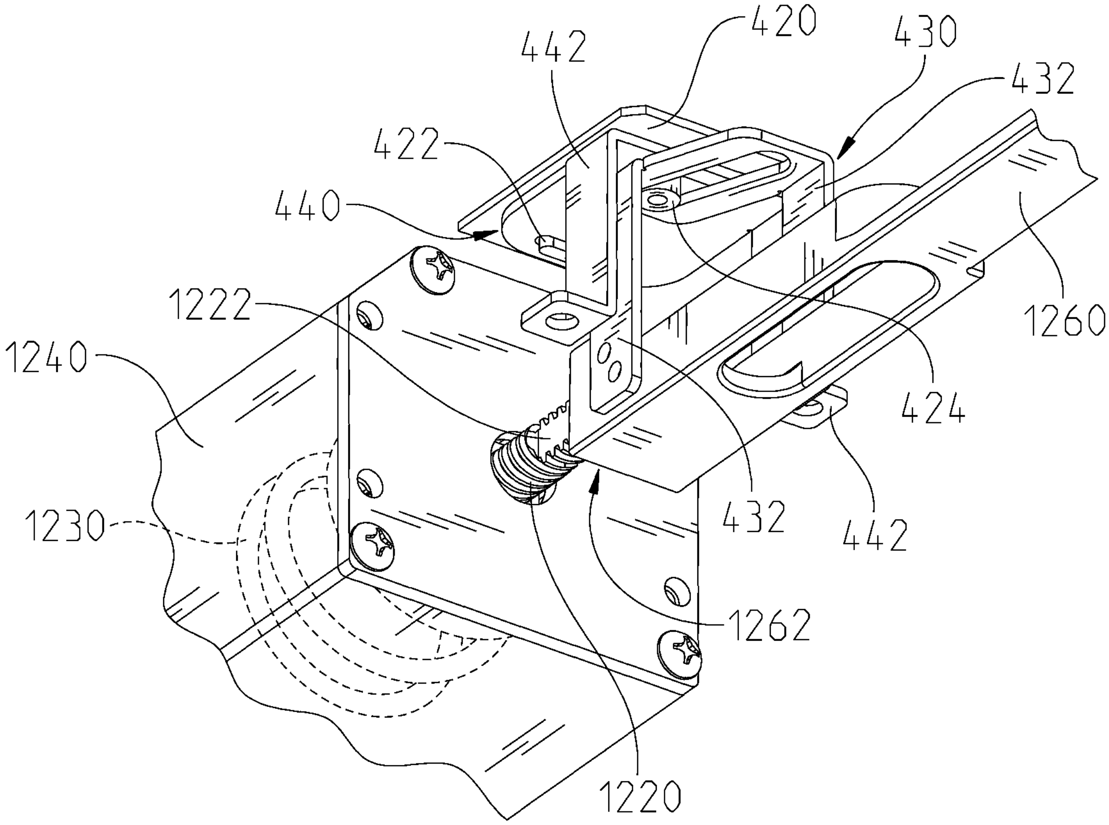
FIG. 17 is another partial, perspective view of the motorized latch retraction system of FIG. 15.

Referring to FIG. 17, lock indicator actuator 430 is secured for movement with retraction arm 260. In the embodiment illustrated, lock indicator actuator 430 includes two arms 432 that straddle retraction arm 1260. In the illustrated embodiments, each arm 432 features apertures through which fasteners are positioned to secure lock indicator actuator 430 to retraction arm 1260.

Figure 16:
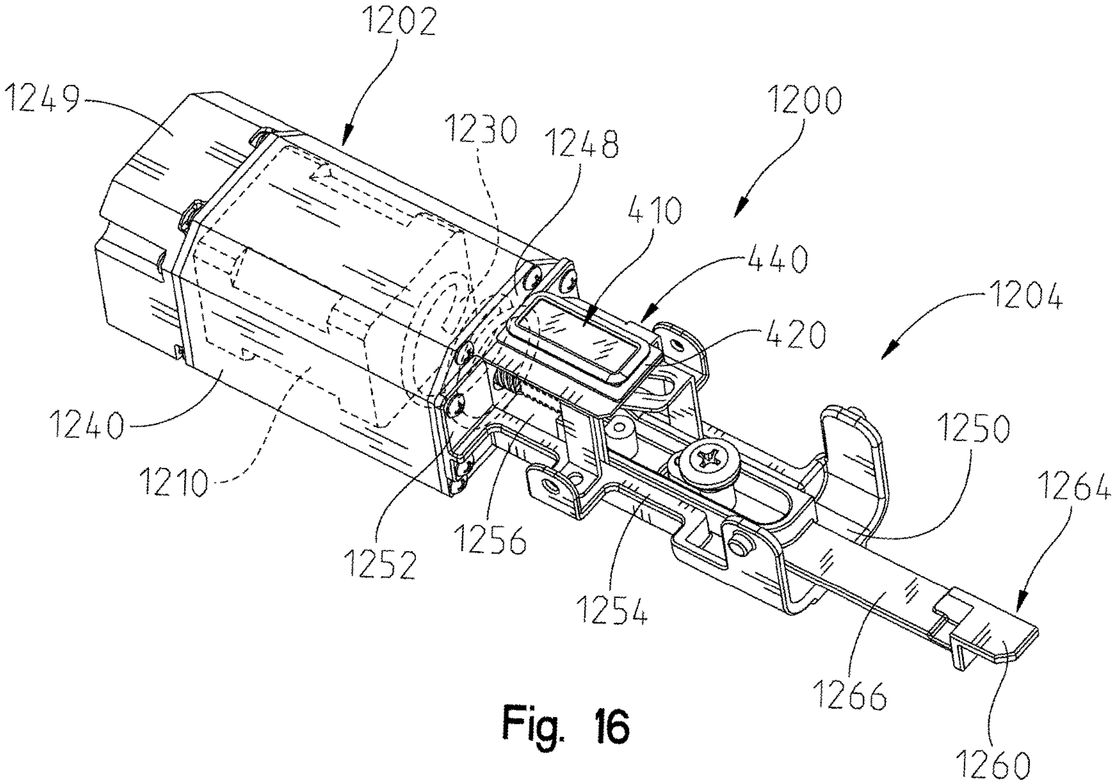
FIG. 16 is a further partial, perspective view of the motorized latch retraction system of FIG. 15.

Referring to FIG. 16, lock indicator guide 440 is secured to retraction guide 1250 such that retraction arm 1260 and lock indicator actuator 430 are actuated by motor 1210 relative to lock indicator guide 440. In the embodiment illustrated, lock indicator guide 440 includes two arms 442 that each feature an aperture through which a fastener is positioned to secure lock indicator guide 440 to retraction guide 1250.

Figure 18:
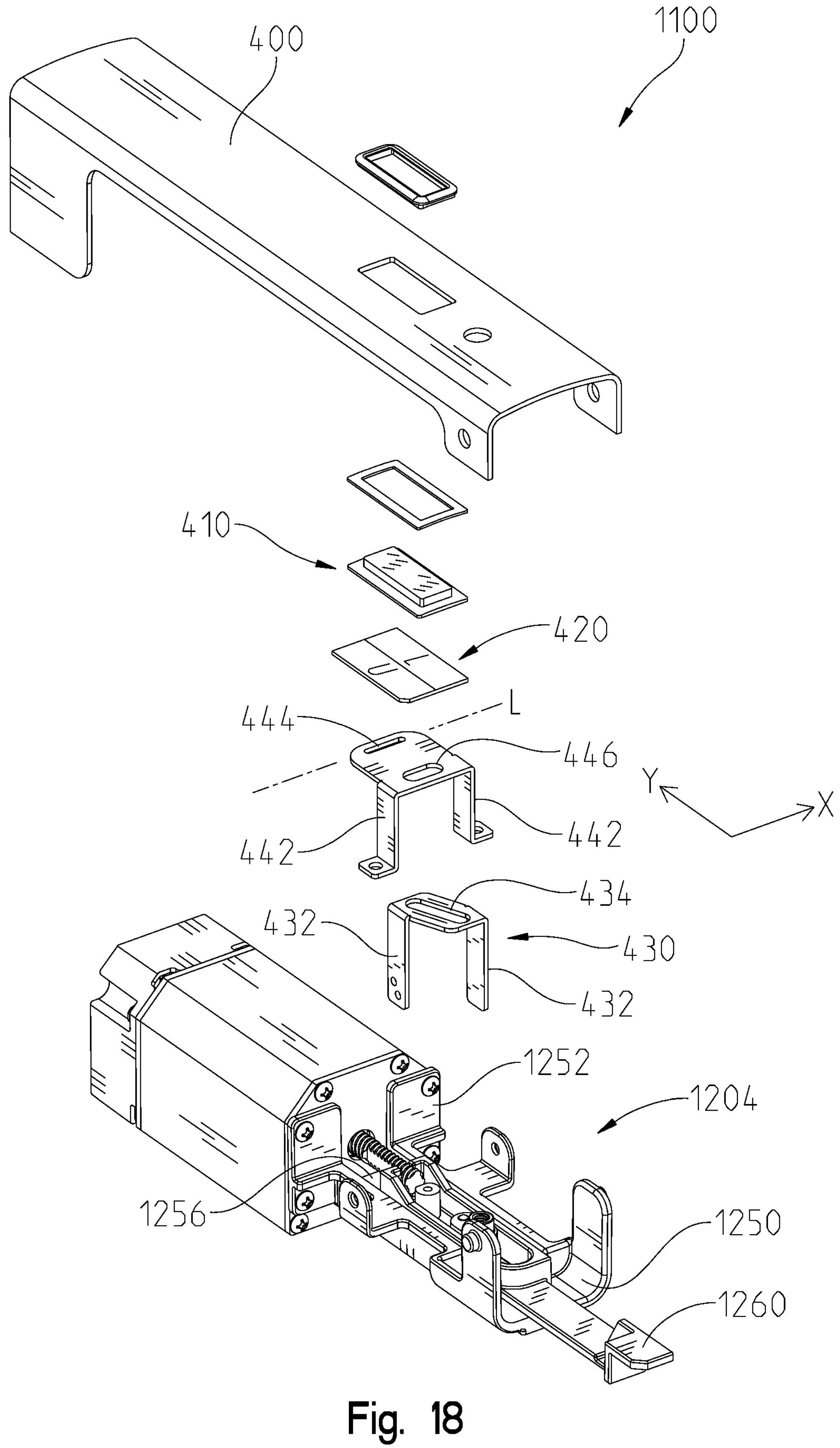
FIG. 18 is an exploded view of components of the lock indicator mechanism of the motorized latch retraction system of FIG. 15.
Figure 19:
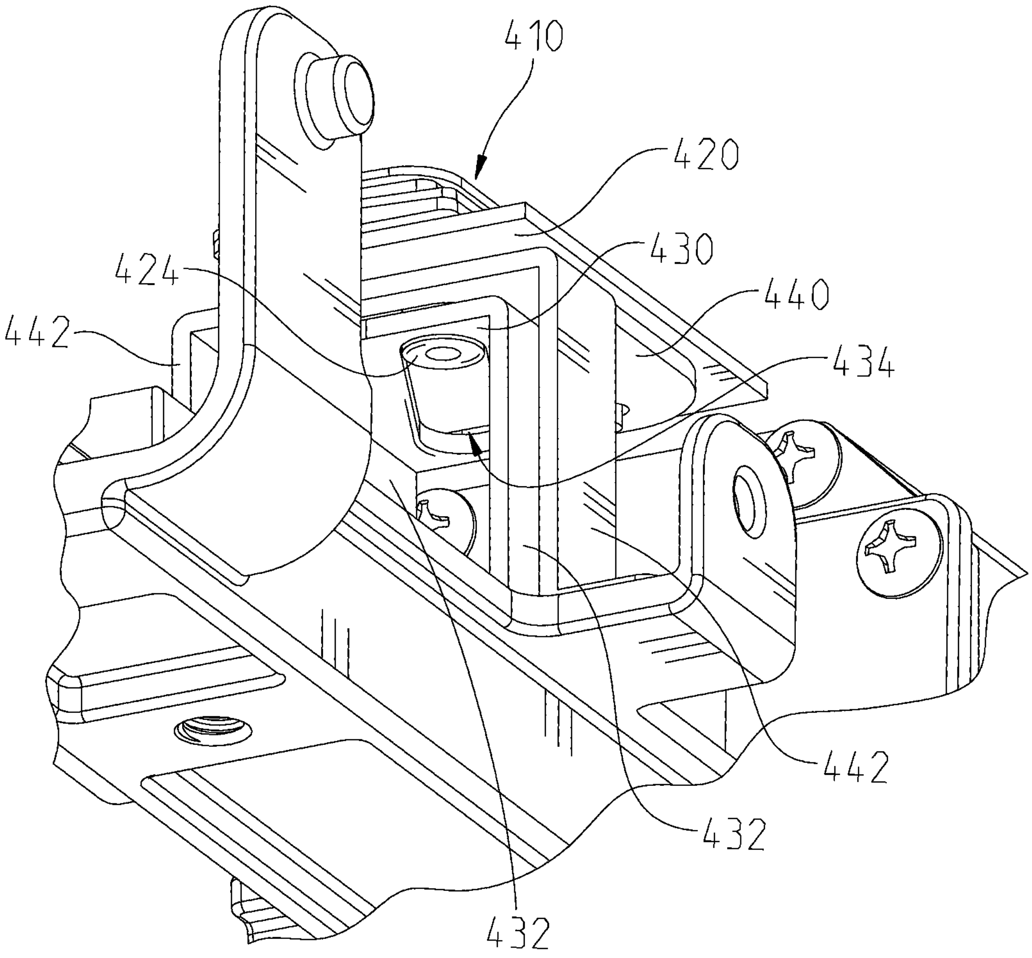
FIGS. 19-21 are further partial, perspective views of the lock indicator mechanism of the motorized latch retraction system of FIG. 15.
Figure 20:
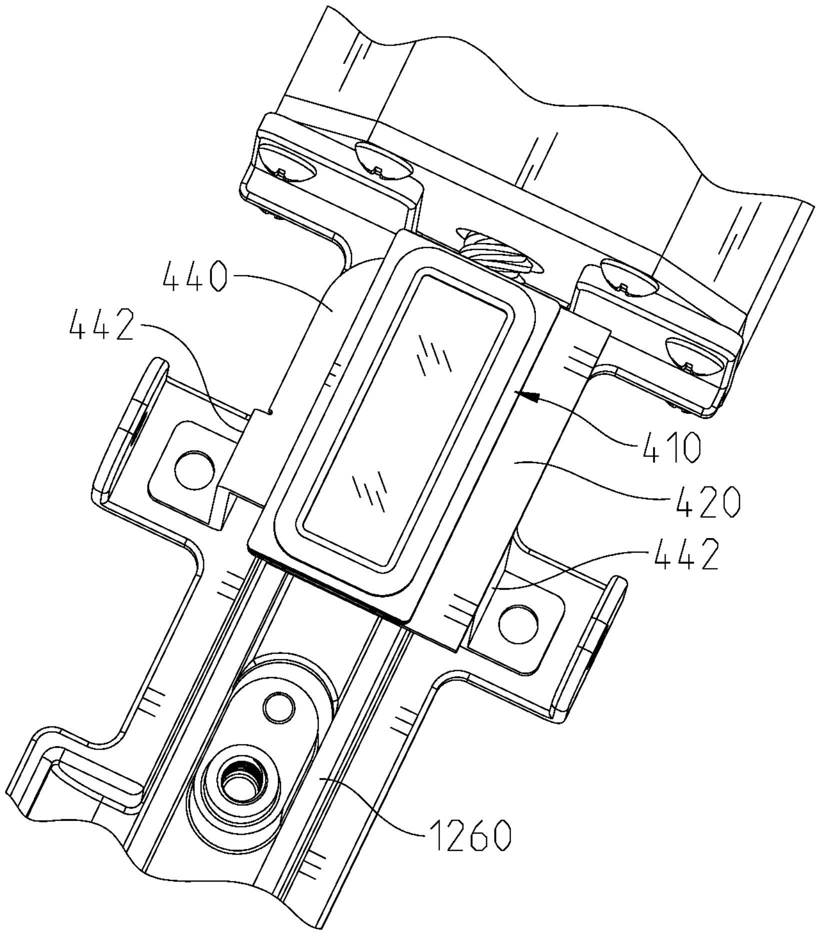
Figure 21:
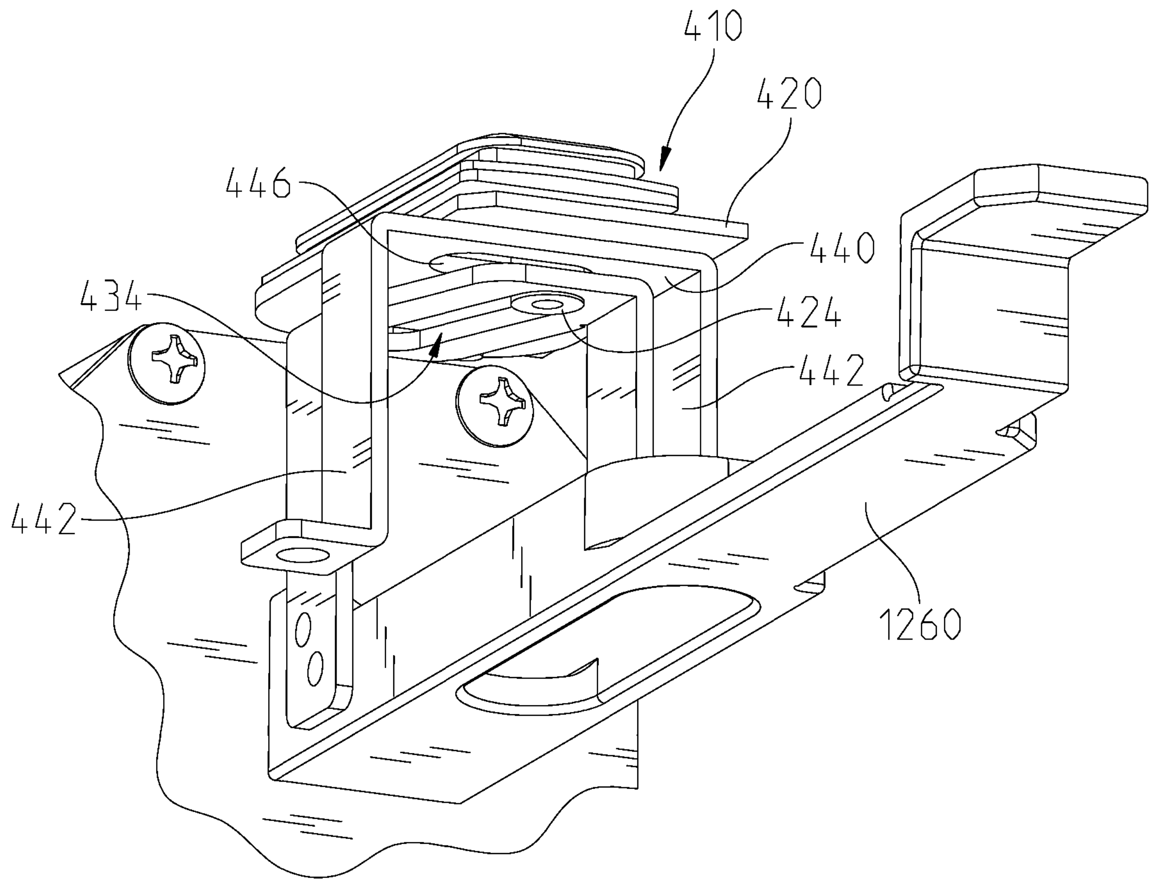

Positioned atop lock indicator guide 440 and sandwiched between lock indicator guide 440 and window 410 is lock indicator 420. Referring to FIG. 18, lock indicator 420 features a visible unlock indicator "U" and a visible lock indicator "L." Visible unlock indicator "U" will be positioned under window 410 by the lock indicator mechanism when MLR system 1200 works to position latch 104 in the unlatched position, as described herein and as shown in FIGS. 19 and 21. Similarly, visible lock indicator "L" will be positioned under window 410 by the lock indicator mechanism when MLR system 1200 works to position latch 104 in the latched position, as described herein and shown in FIG. 17. Lock indicator 420, lock indicator actuator 430 and lock indicator guide 440 cooperate to form the lock indicator mechanism of the embodiment of FIGS. 15-22.

Figure 22:
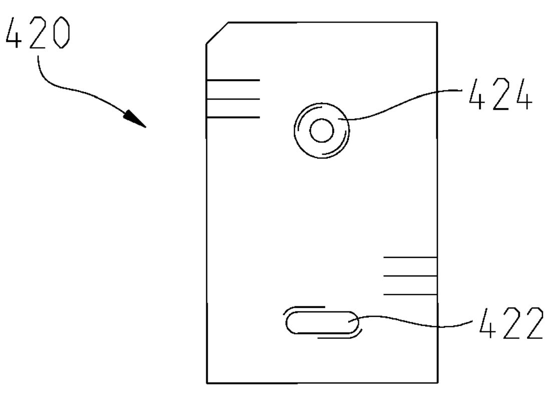
FIG. 22 is a bottom elevational view of the lock indicator.

Referring to FIG. 18, lock indicator guide 440 features elongate slots 444, 446 into which bosses 422, 424 extending from lock indicator 420 (as shown in FIG. 22) are assembled. Boss 422 is elongate and is sized relative to slot 444 into which it is positioned so that relative movement between lock indicator 420 and lock indicator guide 440 is substantially restricted to linear movement along axis L (tolerancing may allow for minor rotational movement or linear movement transverse to axis L). Axis L is parallel to the X axis described below. Boss 424 is round and is positioned in elongate slot 446 of lock indicator guide 440 and diagonal slot 434 of lock indicator actuator 430.

When retraction arm 1260 is actuated by motor 1210, lock indicator actuator 430 travels with retraction arm 1260 along the Y axis marked in FIG. 18. With bosses 422 and 424 positioned within slots 444 and 446, lock indicator 420 is substantially (outside of tolerancing) prevented from similarly articulating along the Y axis. However, as lock indicator actuator 430 moves along the Y axis, boss 424 traverses diagonal slot 434 of lock indicator actuator, which causes displacement of boss 424 and; therefore, lock indicator 420 along the X axis marked in FIG. 18. When retraction arm 1260 is positioned by motor 1210 in its position corresponding to the unlatched position of latch 104, visible unlock indicator U is positioned beneath window 410 and is viewable by an occupant of the area secured by exit device 100 while visible lock indicator L is obscured from view by housing 400. When retraction arm 1260 is positioned by motor 1210 in its position corresponding to the latched position of latch 104, visible lock indicator L is positioned beneath window 410 and is viewable by an occupant of the area secured by exit device 100 while visible unlock indicator U is obscured from view by housing 400. Only one indicator U, L with be visible in the latched and unlatched positions. The indicators U, L may be graphic images signaling the locked or unlocked condition or may be the words "unlocked" and "locked."

Referring now to FIGS. 9-14, another embodiment of exit device 100 and MLR system 200 is provided. The MLR system 200 provides an alternative embodiment of retraction arm 260*a* that includes a lever coupling portion 300 implementing a rack for use in a rack-and-pinion system for actuating the latch 104. As many of the components are similar with regard to the previous embodiments described, those components will not be discussed with respect to FIGS. 9-14.

Figure 9:
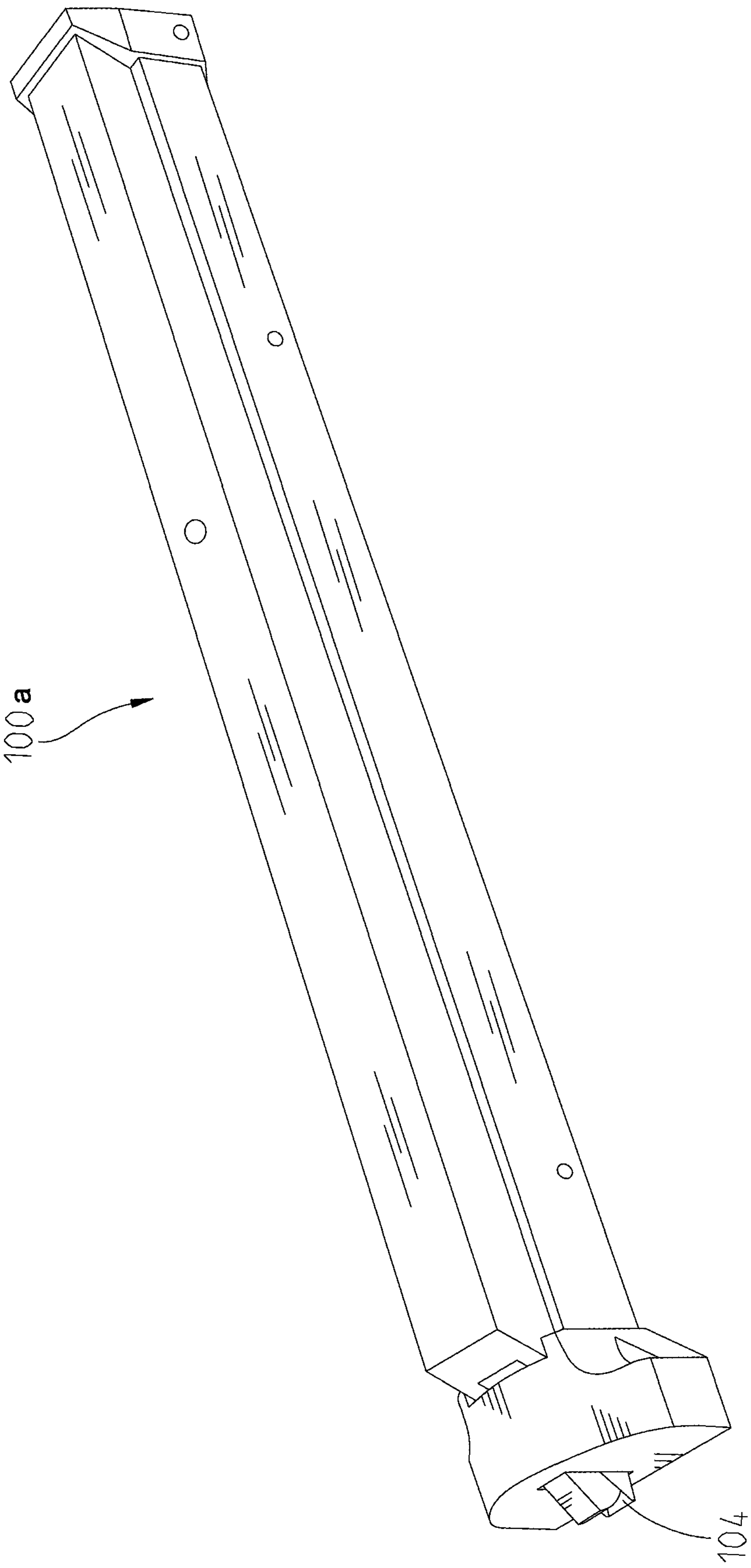
FIG. 9 is a perspective view of an exit device, according to an embodiment.
Figure 10:
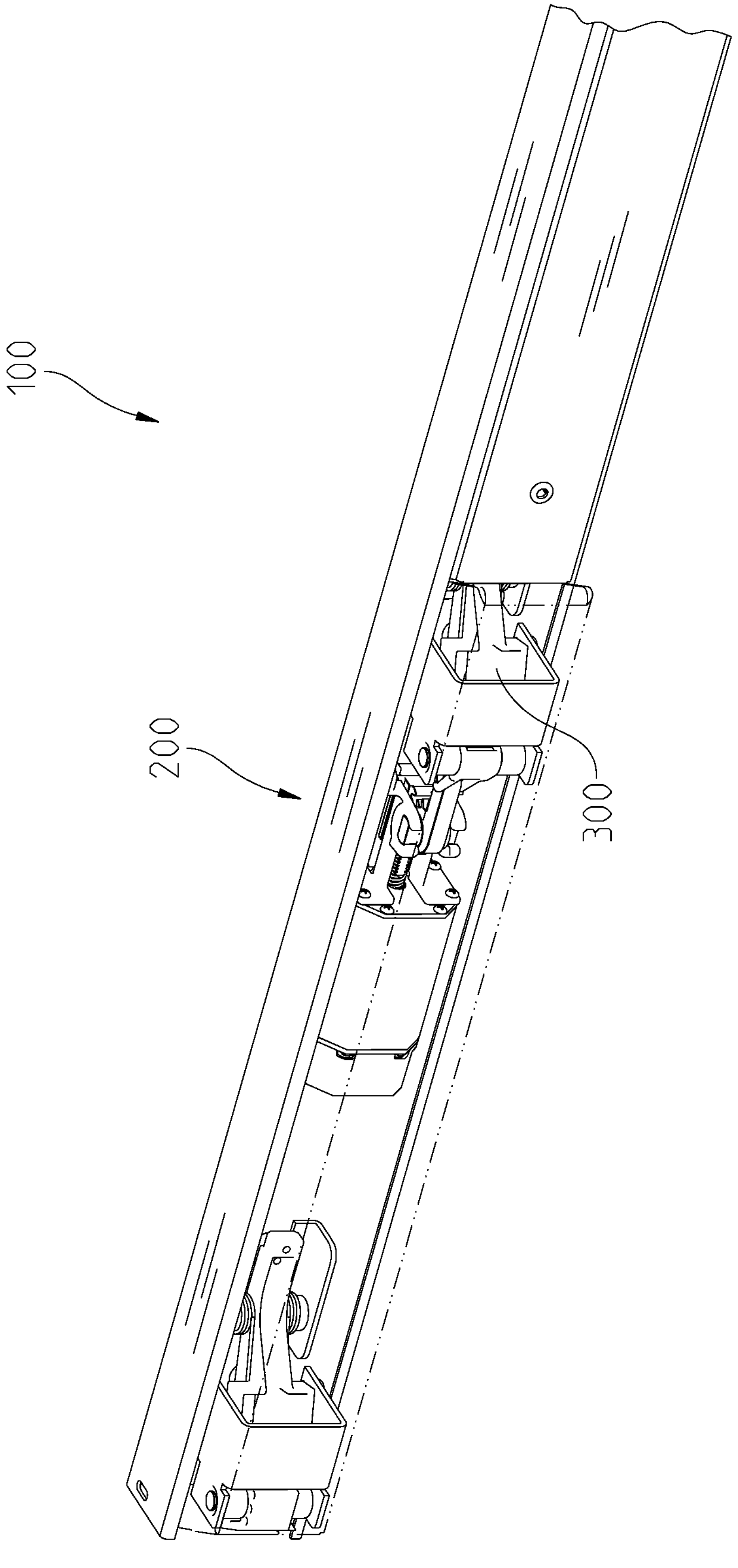
FIG. 10 is a perspective view of an exit device implementing a motorized latch retraction system, according to an embodiment.
Figure 11:
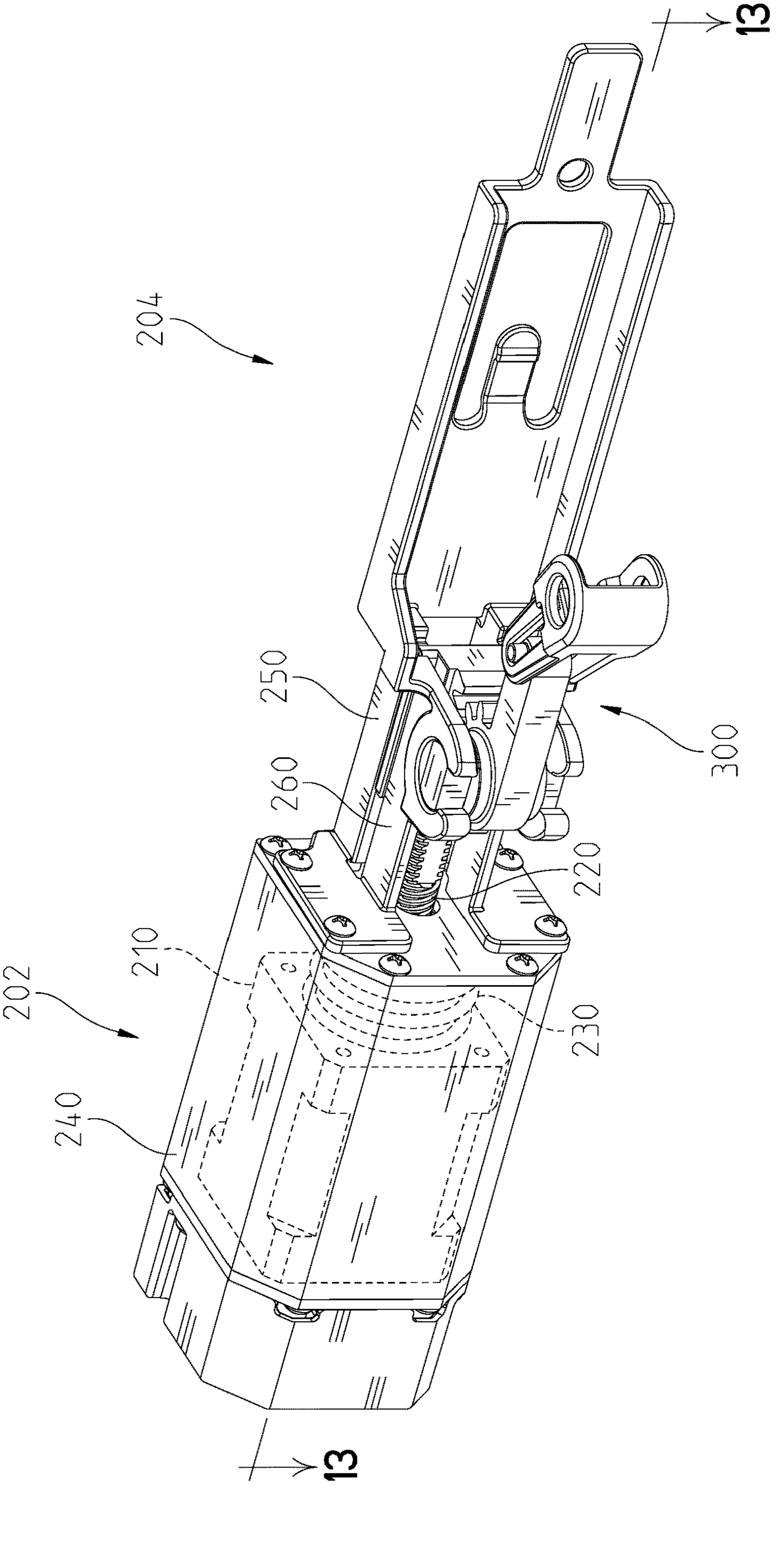
FIG. 11 is a perspective view of a motorized latch retraction system, according to an embodiment.
Figure 12:
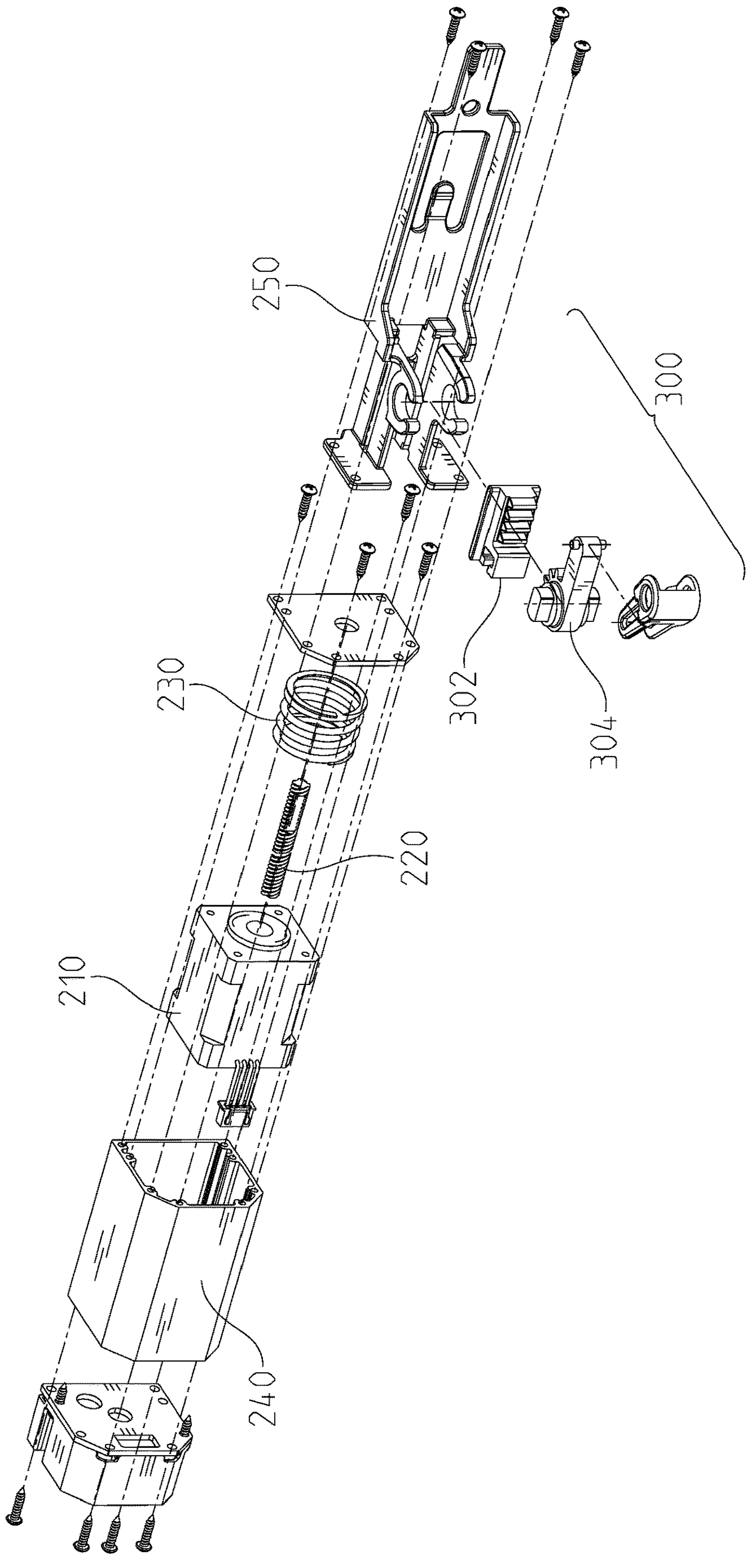
FIG. 12 is an exploded view of the motorized latch retraction system of FIG. 11.
Figure 13:
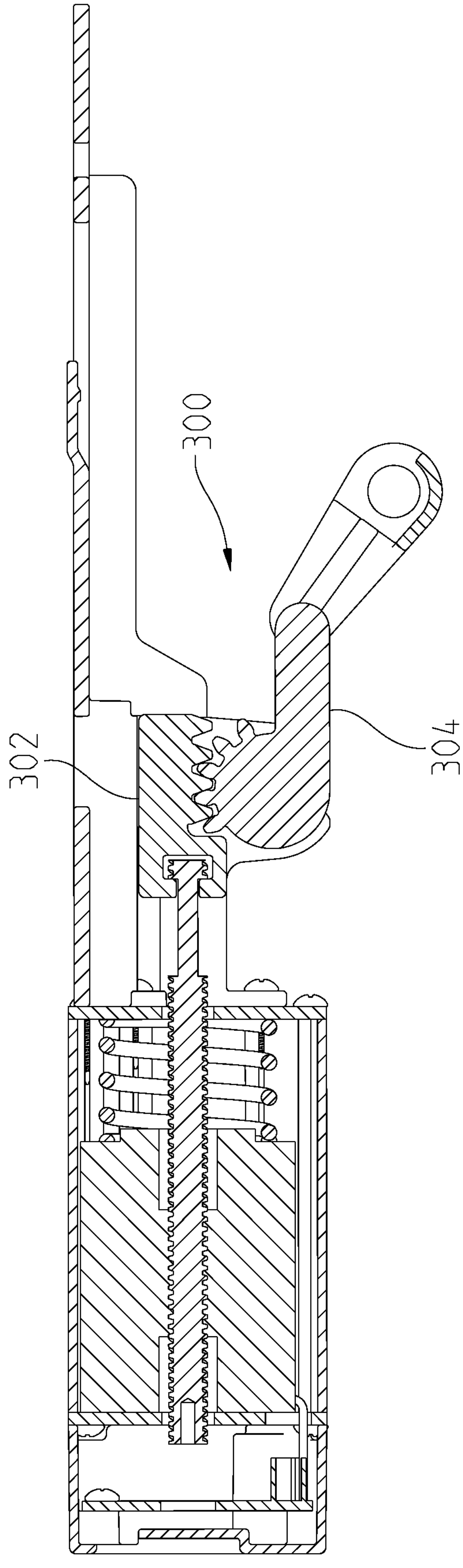
FIG. 13 is a section view of the motorized latch retraction system of FIGS. 11 and 12.
Figure 14:
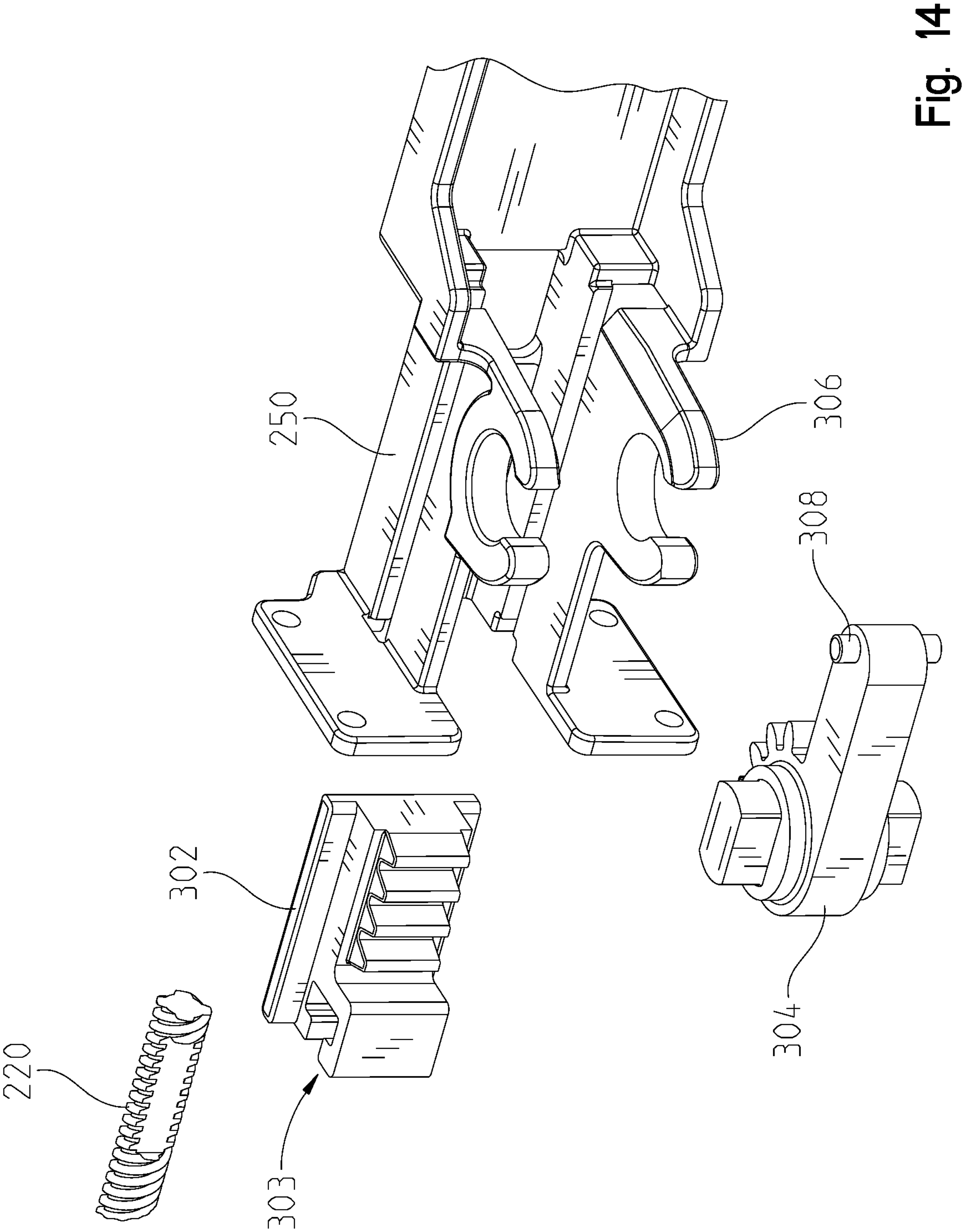
FIG. 14 is a sectional view of a rack and pinion system for implementation on a motorized latch retraction system, according to an embodiment.
Figure 15:
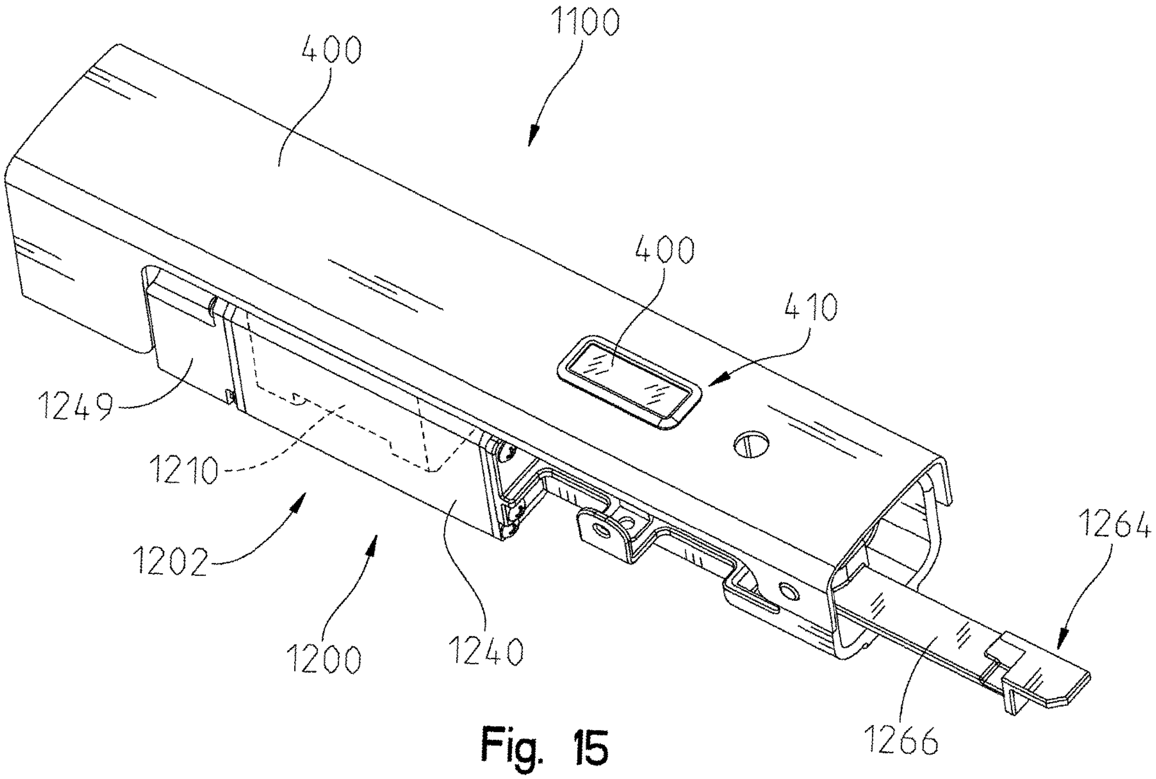
FIG. 15 is a partial, perspective view of a motorized latch retraction system incorporating a lock indicator mechanism in accordance with an embodiment.

FIGS. 9 and 10 show an alternative embodiment of exit device 100*a* implementing MLR system 200 with lever coupling portion 300. As shown in FIG. 11, much of motor assembly 202 and retraction assembly 204 are similar to embodiment previously described. FIGS. 12-14 show lever coupling portion 300 including rack 302 that actuates pinion 304. Rack 302 includes coupling portion 303 that interfaces with actuator 220. Coupling portion 303 may operate similarly as described for actuator receiver 268 with respect to safety release section 222 of actuator 220. Pinion 304 is supported by retraction guide 250 via a pinion support member 306. As actuator 220 is translated toward motor 210, rack 302 moves with actuator 220, which engages pinion 304 and rotates pinion 304. Pinion 304 includes engagement portion 308 that is operably coupled to latch 104, such that latch 104 may be disengaged from the frame of fenestration unit 10. Thus, in this embodiment, once motor 210 has fully actuated rack 302, to disengage latch 104 from the frame, motor 210 is able to float in order to prevent stalling.

The embodiment shown in FIGS. 9-14 may also incorporate all the various features of the motor assembly 202 as discussed with respect to the embodiments shown in FIGS. 1-8 as well as various other related or alternative embodiments to facilitate easy installation and pre-calibration of MLR system 200.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motorized latch retraction system for transitioning a latch of an exit device from a latched position to an unlatched position, the motorized latch retraction system comprising:

a retraction assembly including a guide structure configured to be coupled to the exit device, the retraction assembly having a retraction arm operably coupled to the latch of the exit device, and the retraction arm moveable relative to the guide structure between a first position corresponding to the latched position of the latch and a second position corresponding to the unlatched position of the latch, wherein movement of the retraction arm from the first position to the second position effects movement of the latch from the latched position to the unlatched position; and a motor assembly including:

a floating motor configured for movement relative to the guide structure;

an actuator operably engaged with and extending linearly from the floating motor and actuatable by the floating motor, the actuator operably coupled to the retraction arm to actuate the retraction arm and the latch;

a restrictor fixedly positioned relative to the guide structure of the retraction assembly, the restrictor defining a floating restrictor space, the floating motor positioned within the floating restrictor space, the restrictor having guide surfaces for limiting rotational or linear movement of the motor in a first predefined dimension; and a resilient restraint operably coupled to the floating motor and operable to selectively restrain the floating motor in a second predefined dimension when the retraction arm is not in the second position and to selectively permit the floating motor to move in the second predefined dimension within the restrictor space when the retraction arm is in the second position;

wherein the configuration of the floating motor, the actuator, and the restrictor is such that when the floating motor actuates the actuator, the floating motor is operable to linearly translate within the restrictor space when the retraction arm is in the second position.

2. The motorized latch retraction system of claim 1, wherein the floating motor is operable to linearly translate within the restrictor space when the retraction arm of the retraction assembly is in the second position and the motor continues to be energized.

3. The motorized latch retraction system of claim 2, wherein the restraint is a compression spring positioned between the floating motor and the retraction assembly, and the compression spring is located within the restrictor.

4. The motorized latch retraction system of claim 1, wherein the actuator includes a threaded rod with a section of the threaded rod having threads extending only around a portion thereof to define at least one smooth portion and at least one threaded portion.

5. The motorized latch retraction system of claim 1, wherein the restrictor includes at least one side wall, the at least one side wall operable to limit rotational movement of the motor within the restrictor.

6. The motorized latch retraction system of claim 1, wherein the retraction assembly further includes a retraction guide, the retraction guide operable to receive the retraction arm and limit movement of the retraction arm to linear movement.

7. The motorized latch retraction system of claim 6, wherein the retraction assembly further includes a dogging member for limiting linear movement of the retraction arm when the dogging member engages the retraction arm, the dogging member operable to selectively engage the retraction arm.

8. The motorized latch retraction system of claim 1, further comprising:

a lock indicator having a visible lock indicator and a visible unlock indicator, the lock indicator operably coupled to the retraction arm such that actuation of the retraction arm actuates the lock indicator, actuation of the retraction arm to the first position corresponding to actuation of the lock indicator to a lock indicator position in which the visible lock indicator is viewable and the visible unlock indicator is obscured from view, actuation of the retraction arm to the second position corresponding to actuation of the lock indicator to an unlock indicator position in which the visible unlock indicator is viewable and the visible lock indicator is obscured from view.

9. A motorized latch retraction system with mechanical dogging for retaining a latch of an exit device in an unlatched position, the motorized latch retraction system comprising:

a retraction assembly including a guide structure configured to be coupled to the exit device, the retraction assembly having a retraction arm operably coupled to the latch of the exit device, and the retraction arm moveable relative to the guide structure between an extended position corresponding to the latched position of the latch and a retracted position corresponding to the unlatched position of the latch;

a floating motor configured for movement relative to the guide structure, the floating motor operably coupled to the retraction arm, the floating motor including an actuation member extending linearly therefrom, the actuation member operably coupled to the retraction arm and operable to transition the retraction arm from the extended position to the retracted position; and a mechanical dogging member moveably coupled to the retraction arm, the dogging member operable to be positioned in an active position and a passive position, the dogging member limiting movement of the retraction arm relative to the retraction guide when in the active position.

10. The motorized latch retraction system of claim 9, wherein the motor is a floating motor.

11. The motorized latch retraction system of claim 9, further comprising a retraction guide, the retraction guide operable to receive the retraction arm and limit movement of the retraction arm to linear movement.

12. The motorized latch retraction system of claim 11, wherein the retraction guide further includes a dogging coupling portion, the dogging coupling portion operable to engage the dogging member in a rotatable engagement.

13. The motorized latch retraction system of claim 9, wherein the retraction arm includes a catch element that is operable to engage with the dogging member.

14. The motorized latch retraction system of claim 9, further comprising:

an lock indicator having a visible lock indicator and a visible unlock indicator, the lock indicator operably coupled to the retraction arm such that actuation of the retraction arm actuates the lock indicator, actuation of the retraction arm to the extended position corresponding to actuation of the lock indicator to a lock indicator position in which the visible lock indicator is viewable and the visible unlock indicator is obscured from view, actuation of the retraction arm to the retracted position corresponding to actuation of the lock indicator to an unlock indicator position in which the visible unlock indicator is viewable and the visible lock indicator is obscured from view.

15. A motorized latch retraction system for transitioning a latch of an exit device from a latched position to an unlatched position, the motorized latch retraction system comprising:

a retraction assembly including a guide structure configured to be coupled to the exit device, the retraction assembly having a retraction arm operably coupled to the latch of the exit device, and the retraction arm moveable relative to the guide structure between a first position corresponding to the latched position of the latch and a second position corresponding to the unlatched position of the latch;

a motor assembly including:

a floating motor configured for movement relative to the guide structure;

an actuator operably engaged with and extending linearly from the floating motor and actuatable by the motor, the actuator operably coupled to the retraction arm to actuate the retraction arm and the latch between the latched position and the unlatched position; and a lock indicator having a visible lock indicator and a visible unlock indicator, the lock indicator operably coupled to the retraction arm such that actuation of the retraction arm actuates the lock indicator, actuation of the retraction arm and the latch to the latched position corresponding to actuation of the lock indicator to a lock indicator position in which the visible lock indicator is viewable and the visible unlock indicator is obscured from view, actuation of the retraction arm and the latch to the unlatched position corresponding to actuation of the lock indicator to an unlock indicator position in which the visible unlock indicator is viewable and the visible lock indicator is obscured from view.

16. The motorized latch retraction system of claim 15, further comprising a lock indicator actuator, the lock indicator actuator secured for movement in a first direction with the retraction arm, the lock indicator moving along a second direction different from the first direction between the lock indicator position and the unlock indicator position.

17. The motorized latch retraction system of claim 16, wherein the first direction is orthogonal to the second direction.

18. The motorized latch retraction system of claim 17, further comprising a lock indicator guide, the lock indicator guide obstructing movement of the lock indicator along the first direction and guiding movement of the lock indicator along the second direction.

* * * * *